US012453361B2

(12) United States Patent
Park

(10) Patent No.: US 12,453,361 B2
(45) Date of Patent: Oct. 28, 2025

(54) PROCESS FOR INCREASING YIELD IN PRODUCTION OF PLANT BASED PRODUCTS

(71) Applicant: Steuben Foods, Inc., Elma, NY (US)

(72) Inventor: Donkeun Park, Henrico, VA (US)

(73) Assignee: Steuben Foods, Inc., Elma, NY (US)

( * ) Notice: Subject to any disclaimer, the term of this patent is extended or adjusted under 35 U.S.C. 154(b) by 369 days.

(21) Appl. No.: 17/677,982

(22) Filed: Feb. 22, 2022

(65) Prior Publication Data

US 2022/0264916 A1 Aug. 25, 2022

Related U.S. Application Data

(60) Provisional application No. 63/151,321, filed on Feb. 19, 2021.

(51) Int. Cl.
A23L 7/104 (2016.01)
A23C 11/06 (2025.01)
A23C 11/10 (2025.01)
A23J 1/12 (2006.01)
A23J 3/34 (2006.01)
A23L 7/10 (2016.01)
A23L 11/30 (2016.01)
A23L 11/60 (2025.01)
A23L 33/18 (2016.01)
A23L 33/21 (2016.01)

(52) U.S. Cl.
CPC ............ *A23L 7/107* (2016.08); *A23C 11/06* (2013.01); *A23C 11/103* (2013.01); *A23J 1/125* (2013.01); *A23J 3/346* (2013.01); *A23L 7/115* (2016.08); *A23L 11/33* (2016.08); *A23L 11/60* (2021.01); *A23L 33/18* (2016.08); *A23L 33/21* (2016.08)

(58) Field of Classification Search
CPC .......... A23L 7/107; A23L 33/18; A23L 33/21; A23J 1/125; A23J 3/346; A23C 11/10; A23C 11/06; A23C 11/103
See application file for complete search history.

(56) References Cited

U.S. PATENT DOCUMENTS

| | | | |
|---|---|---|---|
| 4,377,602 A | 3/1983 | Conrad | |
| 5,716,801 A | 2/1998 | Nielsen et al. | |
| 5,846,590 A | 12/1998 | Milkki et al. | |
| 6,171,640 B1 | 1/2001 | Bringe | |
| 6,835,558 B2 | 12/2004 | van Lengerich et al. | |
| 7,566,470 B2 | 7/2009 | Vasanthan et al. | |
| 8,101,377 B2 | 1/2012 | Blanton et al. | |
| 8,575,310 B2 | 11/2013 | Hettiarachchy | |
| 2004/0058051 A1 | 3/2004 | Yunusov et al. | |
| 2006/0134308 A1* | 6/2006 | Inglett | A23L 7/115 426/615 |
| 2008/0311243 A1 | 12/2008 | Vasanthan et al. | |
| 2010/0267613 A1* | 10/2010 | Fritsche | A61P 37/08 426/549 |
| 2013/0266688 A1 | 10/2013 | Ortega et al. | |
| 2015/0257411 A1 | 9/2015 | Janse et al. | |

FOREIGN PATENT DOCUMENTS

| | | |
|---|---|---|
| CN | 100393750 C | 6/2008 |
| CN | 110477373 A * | 11/2019 |
| WO | WO2008132238 A1 | 11/2008 |
| WO | WO2015094714 A1 | 6/2015 |
| WO | WO2017042826 A1 | 3/2017 |
| WO | WO2017139362 A1 | 8/2017 |

OTHER PUBLICATIONS

CN_107668509_A (Clarivate Machine Translation) (Year: 2018).*
Novozymes® Brewing Handbook Version 1 (2013). Novozymes A/S. https://www.occrp.org/images/documents/bioteching-poor-beer-for-poor-countries-P19.pdf Accessed in 2021. Relevant pages: p. 19, 25, 33, and 100-103.
Novozymes Neutrase® pH and temperature curves. Protein ingredients. Information sheet. Dec. 2, 2017 • Luna No. 2017-18336-01. Relevant pp. 1-2.
Bio-Cat. Neutral Protease L Product Information Sheet. 6/19. www.bio-cat.com. Relevant p. 1.
Lamsal BP, Jung S, Johnson LA. Rheological properties of soy protein hydrolysates obtained from limited enzymatic hydrolysis. 2007. LWT—Food Science and Technology. vol. 40, pp. 1215-1223.
Rackis JJ, Sessa DJ, Honig DH. Flavor problems of vegetable food proteins. Journal of the American Oil Chemists' Society. 1979. Vol. 56, pp. 262-271.
Guigoz Y, Solms J. Bitter peptides, occurrence and structure. Chemical Senses. 1976.vol. 2, pp. 71-84.
Maehashi K, Huang L. Bitter peptides and bitter taste receptors. Cellular and Molecular Life Sciences. May 2009;66(10):1661-71. doi: 10.1007/s00018-009-8755-9. PMID: 19153652.
Orts A, Revilla E, Rodriguez-Morgado B, Castaño A, Tejada M, Parrado J, García-Quintanilla A. Protease technology for obtaining a soy pulp extract enriched in bioactive compounds: isoflavones and peptides. Heliyon. 2019. 5(6). Relevant pages: p. 5; pp. 1-6.
Yusoff M, Gordon M, Niranjan K. Aqueous enzyme assisted oil extraction from oilseeds and emulsion deemulsifying methods: a review. Trends in Food Science and Technology. 2014. 41(1): 60-82. (Accepted Version.) Relevant pages: Tables 5-6. Relevant lines: 292-328.

(Continued)

Primary Examiner — Nikki H. Dees
Assistant Examiner — Andrew E Merriam
(74) Attorney, Agent, or Firm — David T. Stephenson; Vincent G. LoTempio

(57) ABSTRACT

A process for using bacterial or fungal metalloprotease and trypsin to solve problems associated with conventional protease extraction techniques by dramatically reducing temperature, incubation time and proteolysis during protease extraction. The present disclosure relates to a protease treatment for increasing yield from plant or other material by extracting nutrients from the fibrous waste portion of milled plant material while preserving the nutritional and functional qualities of the extracted material for use as a food product. The process preserves the quality of the extracted material, including beta glucan and protein, by utilizing low temperatures and minimal protease activity and digestion time during extraction.

21 Claims, 9 Drawing Sheets

(56) References Cited

OTHER PUBLICATIONS

Hanmoungjai P. Pyle DL, Niranjan K. Enzymatic process for extracting oil and protein from rice bran. Journal of the American Oil Chemists' Society. 2001. vol. 78, pp. 817-821.Relevant pages: p. 818; pp. 817-821.
Arte E, Katina K, Holopainen-Mantila U, Nordlund E. Effect of hydrolyzing enzymes on wheat bran cell wall integrity and protein solubility. Cereal Chemistry. 2016. vol. 93(2), pp. 162-171.
Domingo CS, Soria M, Rojas AM, Fissore EN, Gerschenson LN. Protease and hemicellulase assisted extraction of dietary fiber from wastes of cynara cardunculus. International Journal of Molecular Sciences. 2015. vol.16(3), pp. 6057-6075. Relevant pages: Abstract; pp. 6059-6061.
Abdulkarim SM, Lai OM, Muhammad SKS, Long K, Ghazali HM. Use of enzymes to enhance oil recovery during aqueous extraction of moringa oleifera seed oil. Journal of Food Lipids. 2006. vol. 13(2), pp. 113-130.Portion which caused to be listed and relevant pages: pp. 2-10 of Abdulkarim 2006 pdf (approximately pp. 115-120).
Mwaurah PW, Kumar S, Kumar N, Attkan AK, Panghal A, Singh VK, Garg MK. Novel oil extraction technologies: Process conditions, quality parameters, and optimization. Compr Rev Food Sci Food Saf. 2020. vol. 19(1), pp. 3-20. Relevant portion: Abstract; lines 12-14.
Dermiki, Maria; Fitzgerald, Richard J. Physicochemical and gelling properties of whey protein hydrolysates generated at 5 and 50 using Alcalase® and Neutrase®, effect of total solids and incubation time. International Dairy Journal. 2020. vol. 110, pp. 104792. Relevant pages: Abstract; pp. 4-9; pp. 1-9.
Otte, J., Schumacher, E., Ipsen, R., Ju, Z. Y., & Qvist, K. B. Protease-induced gelation of unheated and heated whey proteins: Effects of pH, temperature, and concentrations of protein, enzyme and salts. International Dairy Journal. 1999. vol. 9, pp. 801-812. Relevant pages: Abstract; pp. 804-806.
Xu W, Kong B-H, Zhaox-H. Optimization of some conditions of Neutrase-catalyzed plastein reaction to mediate ACE-inhibitory activity in vitro of casein hydrolysate prepared by Neutrase. J Food Sci Technol. 2014. vol. 51(2), pp. 276-284. Relevant pp. 278-281.
Forrest I.S., Wainright T. The Mode of Binding β-Glucans and Pentosans in Barley Endosperm Cell Walls. Journal of the Institute of Brewing. Sep. 1977; 83(5): 279-286. DOI:10.1002/j.2050-0416. 1977.tb03809. Relevant paragraphs: entire document; p. 279, para. 1, Abstract; p. 284-285, para.8; p. 285, Table VII, lines 9-10 and 16-17 (16hr thermolysin incubation at 40° C.; optimal activity temperature for thermolysin is 70° C.); p. 285 para. 1-6 and Table VIII (viscosity reduction of hot aqueous extract of barley cell wall extracts).
Treimo J, Aspmo SI, Eijsink VG, Horn SJ. Enzymatic solubilization of proteins in brewer's spent grain. J Agric Food Chem. Jul. 9, 2008;56(13):5359-65. doi: 10.1021/jf073317s. Epub Jun. 14, 2008. PMID: 18553975. Relevant paragraphs: p. 5360, paragraph 1.
Mäkinen OE, Wanhalinna V, Zannini E, Arendt Ek. Foods for Special Dietary Needs: Non-dairy Plant-based Milk Substitutes and Fermented Dairy-type Products. Critical Reviews in Food Science and Nutrition. 2016; 56(3); 339-49. doi: 10.1080/10408398.2012. 761950. PMID: 25575046. Publication included in the ISR. Relevant paragraphs: p. 1 para. 1; p. 3 para. 4; p. 4 paras. 3, 4; p. 11 para. 4.
Cai, G., Li, X., Zhang, C., Zhang M., Lu, J. Dextrin as the main turbidity components in wort produced from major malting barley cultivars of Jiangsu province in China. Journal of the Institute of Brewing. July (2016). vol. 122(3), pp. 543-546. DOI: 10.1002/jib. 356 Relevant pages: pg. 544 para 3.
Balcerek, M., Pielech-Przybylska, K. Effect of supportive enzymes on chemical composition and viscosity of rye mashes obtained by the pressureless liberation of starch method and efficiency of their fermentation. European Food Research and Technology. (2009). vol. 229, pp. 141-151. DOI: 10.1007/S00217-009-1035-Y Relevant pages: p. 141, abstract: p. 145, Table 2 (shows bacillolysin does not decrease viscosity of treated material); p. 149, para 1-6; p. 150, para 7.
Patent Cooperation Treaty (PCT). The International Search Report (ISR) for PCT Appl. Ser. No. PCT/US2022/017389. Dated: May 13, 2022. No Examiner listed. ISR is 8 pages but a total of 42 pages with non-patent publications annexed.
European Patent Office (EPO). The Supplementary European Search Report for EPO App. Serial No. 22 757 139.5. Dated Sep. 30, 2024. Total 8 pages.

\* cited by examiner

PROCESS FOR INCREASING YIELD IN PRODUCTION OF PLANT BASED PRODUCTS

CROSS-REFERENCE TO RELATED APPLICATIONS

This patent application claims the benefit of U.S. Prov. Pat. App. Ser. No. 63/151,321, filed Feb. 19, 2021, which is incorporated herein in its entirety.

FIELD

The present disclosure relates to a process for increasing nutrient yield during the production of plant based foods and beverages, including plant based milk.

BACKGROUND

During the production of plant based milk from grains, nuts or seeds a certain percentage of the plant material may be discarded as waste. This waste material may be comprised of viscous, insoluble, fibrous retentate or slurry that is, even after dilution, difficult or impossible to pass through a mesh filter during plant based milk processing. The fibrous slurry is comprised primarily of fibrous cell wall material, such as bran and seed coats, which often contain valuable nutrients. This material may contain beta glucan, protein and bioactive phenols and antioxidants present in higher quantities in the cell wall. Utilizing the fibrous slurry, rather than discarding it, is therefore highly desirable.

Currently, the primary use of bran, or bran-like material, is as a low-value ingredient for human and animal consumption. The comparatively lower use as an ingredient in food is related to sensory attributes and texture of bran and bran extracts and low efficiency of methods of extraction of nutrients. For example, bran nutrient extracts may have a bitter taste related to the presence of certain protein degradation products or lipids turning rancid upon oxidation and incompatibility with certain food matrices.

In order to utilize the fibrous material from grain it is often necessary to further process the material in order to disrupt interactions between fibers to reduce viscosity and improve texture. These interactions can be disrupted by treatment using enzymes that degrade and separate cell wall material. For example, in wheat processing, enzymes including cellulase, hemicellulase, lipase, protease, amylase and xylanase have been used to promote separation of the grain material (WO2008132238A1). Cellulase, hemicellulase and xylanase are known to act directly on major components of cell walls to promote degradation. Amylase, lipase and protease act on starch, fat and proteins that are not major components of the cell wall, however, their enzymatic degradation may disrupt some interactions between cell wall components.

In the brewing industry, xylanase is used to break down cell wall material of grains used in brewing to promote processing and increase yield (Novozymes®, 2013). Xylanase breaks down xylan, a major component of cell wall material in grains. The protease Neutrase® endoprotease NOVOZYMES may be used in combination with xylanase in the brewing process to increase free amino nitrogen (FAN) that are released during hydrolysis of proteins so that yeast can utilize FAN to promote growth (Novozymes®, 2013). Neutrase® endoprotease NOVOZYMES may also be thought to degrade proteins that are part of a matrix that may promote cell wall stability (Novozymes®, 2013). While xylanase, cellulase, and hemicellulase are effective at reducing viscosity in fibrous grain waste, they may have undesirable side effects on the final food product and during further processing, including the production of sugar as a byproduct. Lipase, amylase and protease may have undesirable effects on the final product as well, however, these effects may differ from those caused by xylanase, cellulase, and hemicellulase.

Proteases alone are not conventionally used to reduce viscosity of grain material. In a publication for the brewing industry, Novozymes®, a leading manufacturer of commercial enzymes, lists xylanases, cellulases, hemi-cellulases and beta glucanases, as well as alpha-amylases, for use in viscosity reduction, while listing Neutrase® endoprotease NOVOZYMES for use in fermentation enhancement by protein digestion (Novozymes® Brewing Manual, pg. 40). Novozymes® markets Neutrase® endoprotease NOVOZYMES for use in oat processing with its "Neutrase® for Oats" product, stating that "Neutrase® is a high quality broad-spectrum endoprotease that provides a mild hydrolysis. It can be used to improve protein solubility." (Novozymes®, 2021). Novozymes® lists the working temperature range of Neutrase® for Oats™ as 30-65° C. and a working pH range of 6-9 (Novozymes®, 2021). BIO-CAT, a supplier of enzymes, discloses in its product information sheet that NEUTRAL PROTEASE L (a version of Neutrase® endoprotease NOVOZYMES) "Decreases viscosity of fish or chicken by-products" (BIO-CAT, 2019). BIO-CAT discloses a temperature range of 30° C.-70° C., with an optimum temperature of 55° C. BIO-CAT discloses a pH range of 5.5-9.0, with an optimum pH of 6.5. BIO-CAT discloses that the usage rate for typical hydrolysis varies depending on application, with a typical range of 0.1%-1.0% (BIO-CAT, 2019).

While the use of protease to reduce viscosity in grain material is not common, protease extraction, however, where nutrients are separated and purified, is a well-known method of increasing nutrient yield from fibrous plant material, including grain. Protease extraction generally involves endoproteases, which cleave peptide bonds within proteins. Cleavage of the peptide bond during protease extraction, however, can impair functionality of the protein and other nutrients. For example, native proteins, or proteins close to their native state may have better organoleptic properties and foamability, as well as other properties.

The effect of protein hydrolysis on protein functionality is heavily dependent upon hydrolysis conditions, including pH, temperature, duration of hydrolysis, enzyme selection, and enzyme and substrate concentration. (Wouters, et al. 2016). Some studies show that protein hydrolysis has a negative impact on gel strength when compared to intact protein (Lamsal et al., 2007; Fan et al., 2005; Pinterits and Arntfield, 2007).

Taste and aroma aspects of protein hydrolysate affect the quality of finished products. In the case of soy proteins, beany or grassy taste in hydrolysates is a problem (Rackis et al., 1979; Wansink and Chan, 2001; Wansink and Park, 2002; Damodaran and Arora 2013). In addition, protein hydrolysis often induces bitterness (Guigoz and Solms, 1976; Maehashi and Huang, 2009).

Protease treatment is typically performed at temperatures between approximately 30° C. and 65° C., where enzyme activity is optimal or close to optimal, although this can vary depending on the enzyme, the enzyme source and the application. As disclosed above, Novozymes® lists the working temperature range of Neutrase® for Oats™ as 30-65° C. and a working pH range of 6-9 (Novozymes®, 2021), with an optimal temperature for activity at approximately 42° C. According to Novozymes® manual, optimal pH for Neutrase® endoprotease NOVOZYMES treatment is approximately 6, with activity dropping rapidly to 0 at a pH of approximately 4.3.

With regard to the temperature used during Neutrase® endoprotease NOVOZYMES digestion of grain, U.S. Pat. No. 4,377,602 to Conrad discloses a process for the preparation of a hydrolyzed product from crushed whole grain using a protease. The process of Conrad produced a product containing protein and sugar from a grain slurry by transforming water insoluble proteins into water soluble products. After 1 hour at 50° C., according to Conrad, all protein had been transformed into water soluble products. These conditions lead to a product with a relatively high degree of hydrolysis and protein denaturation. This resulted in a lower viscosity milk having inferior texture and mouthfeel.

While protease extraction of protein and other nutrients from fibrous material has been effective, it has limitations. Protease treatment generally hydrolyzes the protein to a certain degree, breaking up the intact protein into smaller fragments. This can affect the functionality of the protein, giving the protein a bitter taste and affecting its emulsifying properties, digestibility and viscosity. Additionally, protease extractions from bran and other insoluble material are taught to be performed at relatively high temperatures, typically in a range of approximately 30° C.-65° C., and are generally performed over extended periods of time. Proteases, like most enzymes, have an optimal range of time and temperature at which they are effective. For the proteases that have been used in nutrient extraction from bran, time and temperature typically range between 30° C.-65° C. and 1-24 hours.

U.S. Pat. Pub. No. 20150257411 to Janse also discloses using a Neutrase® endoprotease NOVOZYMES-like protease to extract protein from fibrous rice bran. Janse increased yield of protein from rice bran while limiting the degree of hydrolysis of the protein in order to generally maintain molecular weight of the hydrolysate above 500 kDa. Janse teaches incubating a protease with the rice bran for approximately 1-4 hours at between 45° C. and 65° C., or more preferably where the incubation temperature is between 48° C. and 55° C., with optimal metalloendoprotease extraction at pH 7.0 and 50° C. Janse claimed a relatively low degree of hydrolysis (DH) of between 10 and 16% from the claimed process.

Similarly, U.S. Pat. No. 8,575,310 to Hettiarachchy teaches a limited hydrolysis protease extraction from rice bran where the reaction conditions were optimized at 50° C. for 1 hour at a pH 8.0. Janse and Hettiarachchy disclosed a relatively low DH, generally between approximately 10% and 25%. U.S. Pat. No. 5,716,801 to Nielsen discloses use of protease to generate taste and organoleptically acceptable protein hydrolysates from plant based proteins. Nielsen discloses a DH of between 15 and 35% and teaches a protease treatment at 55° C. for 18 hours, where the pH is 8.5 for Alcalase® endoprotease NOVOZYMES treatment and optimally 7.0 for Neutrase® endoprotease NOVOZYMES treatment. The protease was inactivated to terminate proteolysis after 18 hours by lowering the pH to 4.2 by means of 30% HCl.

In a paper entitled "Protease technology for obtaining a soy pulp extract enriched in bioactive compounds: isoflavones and peptides", Orts discloses a process for extracting bioactive components from soy pulp, which is conventionally discarded as waste (Orts et al. 2019). Orts developed a process for extracting certain nutrients, including protein fragments and isoflavones, from soy pulp using protease. Orts teaches optimal protease extraction conditions of approximately 2 hours at 55° C.

Hanmoungjai et al. (2001), in a paper entitled "Enzymatic Process for Extracting Oil and Protein from Rice Bran", discloses a method for enzymatic extraction of oil and protein from using a commercial protease (Alcalase® endoprotease NOVOZYMES). Hanmoungjai teaches extraction conditions of 1-3 hours, and 40-60° C., respectively. In a paper entitled "Effect of hydrolyzing enzymes on wheat bran cell wall integrity and protein solubility", Arte et al. (2016) disclosed a process for treating wheat bran with protease to extract proteins. Arte teaches an optimized protease treatment of 3 hours at 35° C. Santo Domingo et al. (2015) discloses a method for protease treatment of insoluble plant fiber waste material that extracts fiber. Santo Domingo teaches optimal protease conditions of 40° C. for 5 hours.

Abdulkarim et al. (2006), in a paper entitled "Use of Enzymes to enhance oil recovery during aqueous extraction of Moringa Oleifera seed oil", discloses a method of protease extraction of oil from Moringa Oleifera seed. Abdulkarim teaches optimal protease extraction with Neutrase® endoprotease NOVOZYMES at conditions of 45° C. for a 2 hour incubation time at pH 6.8.

In a literature review relating to protease extraction for plant nutrients, Yussof et al. (2014) disclosed conventional, optimal reaction conditions:

> According to Rui et al. (2009), the optimum temperature range for enzymatic hydrolysis is between 40-55° C., thus many authors employ AEE (aqueous enzymatic extraction) temperatures which fall within this range. In practice, one often prefers to use the lowest possible temperature yielding adequate activity (Passos et al. 2009). In the case of olive fruits, a lower temperature of 30° C. was found to be favourable, especially to preserve the oil quality (Aliakbarian et al. 2008; De Faveri et al. 2008; Ranalli et al. 2003; Garcia et al. 2001; Ranalli et al. 1999). Gros et al. (2003) also used a temperature of 34° C. for similar reason in linseed oil extraction. A significant effect of temperature on oil yield was reported by Sharma et al. (2002), where highest peanut oil yield was observed at 40° C., but it decreased significantly when the temperature was reduced to 37° C.

Yussof et al. (2014) further noted that incubation time is another factor that can be a limitation for enzymatic extraction of nutrients from plant material, where longer incubation times can have a negative impact on the quality of nutrients being extracted from plant material:

> According to Jiang et al. (2010), Abdulkarim et al. (2006), Santos and Ferrari (2005), and Dominguez et al. (1996), degradation of cell wall components can be enhanced by prolonging the incubation time. Passos et al. (2009) also reported that the use of an enzyme mixture of cellulase, protease, xylanase, and pectinase for 120 hours resulted in 3.8% higher yield as compared to 24 hours of incubation time. However, this time duration (i.e. 120 hours) is far too long to be acceptable in practice (Passos et al. 2009), lower oil quality may result (Jiang et al. 2010), leading to high energy usage and production of undesirable products (Abdulkarim et al. 2006).

A review by Mwaurah et al. (2020) compared known techniques for oil extraction from plant material, including seeds. With regard to enzymatic extraction, Mwaurah states that "Studies reveal an enzyme to substrate ratio of 1% to 8%, the temperature of 40 to 55° C., and a pH of 4 to 8 to be typical for enzymatic extraction of oil from different oilseeds." (Mwaurah et al. 2020).

According to Mwaurah, oil extraction from grains is dependent on proteolytic activity, and proteolytic activity is sensitive to temperature and pH. Due to temperature sensitivity of proteases, Mwaurah writes that "[t]emperature is one of the critical factors as far as any oil extraction technique is concerned."

Protease extractions have also been used specifically to extract beta glucan from grains such as oat and barley, as well as other sources of beta glucan. Beta glucans are found in cereal grains, including oat and barley, as well as bacteria, fungi, yeasts, algae, and lichens. Beta glucan is utilized in several fields, especially for functional foods. Beta glucan has been shown to have medical benefits, particularly with regard to immunity and cholesterol reduction.

Beta glucan is an important structural component of the cell wall in cereal grains, and is generally difficult to extract from these plant products. Conventional methods of beta glucan extraction include the use of acid or alkali solutions, which often result in degradation of the beta glucan polymer, thereby decreasing its bioactivity and resulting health benefits. "To avoid alkaline-acid methods considered to be degrading to beta glucans, some researchers introduced enzymatic extraction as an alternative to treatments with strong chemical solvents." (Avramia and Amariei, 2021). When protease treatment is used to extract beta glucan from cell wall material, however, long treatment times and high temperatures are generally used, for example treatment to the cell walls for 5 h at pH=10.5 and 45° C. followed by successive washes of the sediment with acetone or ethanol. (Avramia and Amariei, 2021). These conditions will lead to severe protein degradation, however, and for the purpose of beta glucan extraction alone, these conditions may be acceptable because protein degradation is not of concern. In an application where extraction of native beta glucan and native protein is desirable, such as a plant based milk, conventional methods for beta glucan extraction with protease are not desirable.

The references cited above demonstrate that extracting nutrients from plant material using protease under optimal or conventional conditions can have effects that are detrimental to the quality of the extracted nutrients. Protease treatment under optimal or conventional conditions can cause protein degradation, which may decrease functionality of the protein. Further, protease treatment under conventional conditions utilizes temperatures that foster rapid microbial growth. Additionally, conventional protease reaction incubation conditions promote lipase activity, causing oxidization of oils and negatively impacting taste. Additionally, protein structure may be altered by heat or high DH under standard protease reaction conditions, thereby affecting functional properties of the protein. In summary, lower temperatures and shorter incubation times are desirable during protease extraction of nutrients from plant material, particularly for use in applications such as plant based milk.

SUMMARY

The present disclosure solves the problems associated with conventional protease extraction techniques by dramatically reducing temperature, incubation time and proteolysis during protease extraction. The present disclosure relates to a protease treatment for increasing yield from plant or other material by extracting nutrients from the fibrous waste portion of milled plant material while preserving the nutritional and functional qualities of the extracted material for use as a food product. The process preserves the quality of the extracted material, including beta glucan and protein, by utilizing low temperatures and minimal protease activity and digestion time during extraction. In some embodiments, the process of the present disclosure is used in combination with aqueous wet milling for producing plant or microbial based milks or liquids. In some embodiments of the present disclosure, total nutrient yield from raw grain may be increased by approximately 5-10% or more, and for particular desirable nutrients including beta glucan in oat, can result in up to or more than approximately 80% increase in yield, thereby providing a yield of close to of approximately 80% or greater for total beta glucan from the grain in a final product.

In one embodiment, oat grain is aqueous wet milled and filtered at low temperature to produce a primary plant based milk. After filtering, a fibrous slurry, or retentate, is separated from the primary milk. The fibrous slurry has a viscosity and texture that, even after dilution, prevents passage of the material through the mesh filter. After filtration, which may also be referred to herein as sifting, the fibrous slurry, which may be approximately 40% total solids, may then be diluted to approximately 5-15% total solids and briefly milled. In one embodiment, throughout the process, the diluted fibrous retentate, or fibrous slurry, is maintained at a low temperature, slightly above 0° C. The fibrous slurry may then be transferred to a tank and maintained at low temperature. The diluted fibrous slurry may then be treated with protease, which may preferably be Neutrase® endoprotease NOVOZYMES or an equivalent, or microbial trypsin, for reaction at low temperatures of between approximately 0° and 5° C. A low temperature reaction, where proteolysis activity is negligible or undetectable, protects the native structure of the protein, thereby maintaining the functionality of the native protein.

Surprisingly, addition of Neutrase® endoprotease NOVOZYMES to the fibrous slurry results in a rapid and substantial decrease in viscosity. The viscosity reduction from Neutrase® endoprotease NOVOZYMES, which may be added at a standard usage rate, or lower, is substantial and unexpected, considering the low temperature of the substrate fibrous slurry. In some embodiments, the viscosity reduction, after less than ten minutes of enzyme reaction time, is sufficient to allow filtering of the retentate to produce a commercially viable secondary plant based milk. Without enzyme treatment the diluted fibrous slurry remains highly viscous and slimy, and, in practical terms, unprocessable for most applications, including production of plant based milk.

Treatment with Neutrase® endoprotease NOVOZYMES followed by filtering produces a secondary milk. The secondary milk may, in some embodiments, comprise approximately 10% of the total solids of the raw grain material. Considering the low cost of the process of the present disclosure, 10% is a significant and commercially relevant increase in yield.

Before the secondary milk can be packaged, it must first be heat treated to deactivate the protease, or any other enzymes that may be used during processing in addition to protease. Heat treatment generally comprises a rapid heating to a temperature to denature the enzyme, which, in the present case, may be approximately 75° C. to 90° C. Rapid heating during enzyme inactivation prevents significant protease activity and proteolysis during the deactivation step and limits heat denaturation of protein, as well as microbial growth. Heat treatment to inactivate the enzyme may, in some applications, be followed by a second heat treatment to prevent microbial growth in the final product after packaging.

During the heat inactivation step, viscosity of a grain product will generally increase due to gelatinization of starch or other interactions. Surprisingly, in the present disclosure, heating the Neutrase® endoprotease NOVOZYMES treated fibrous slurry to inactivate the enzyme did not cause a significant increase in viscosity. Gelatinization occurs when products containing starch granules are heated to temperatures that cause a disruption of molecular bonding in the starch, leading to absorption of water and an increase in viscosity. While the amount of starch in the oat fibrous slurry of the present disclosure is relatively low compared to the primary oat milk, gelatinization was expected to cause a significant increase in viscosity, leading to this surprising result.

The unexpected absence of a significant increase in viscosity during protease inactivation has important implications for further processing of the secondary milk in accordance with the present disclosure. Generally, amylase is added to plant based milks during liquefaction. Amylase is typically necessary to degrade starch during gelatinization, thereby reducing viscosity and liquefying the product. Liquefaction allows plant based milks to be processed at high heat without clogging pipes in the processor.

The relatively low viscosity of the heat inactivated secondary milk after Neutrase® endoprotease NOVOZYMES treatment and enzyme deactivation allows for full processing of the secondary milk without the use of amylase or other enzymes for liquefaction. The elimination, or reduction, of the need for amylase in the product has significant benefits in terms of cost and consumer demand. Amylase treatment results in the production of sugar, as does treatment with many other enzymes that are used for viscosity reduction, which may be undesirable in some products. Amylase treatment may also, in some cases, have a negative impact on flavor. Further, there exists a growing consumer demand for clean label products, and elimination of an ingredient, such as an enzyme, can improve consumer perception of the product, particularly for plant based products like oat milk.

In some embodiments, increasing the total milk yield from grain, such as oat, by approximately 9-10% and from nuts, such as almond, by approximately 5%. The process increases the yield of protein, fat, fiber, carbohydrates and ash from the grain or nut. For grains such as oat, the fibrous slurry is particularly high in beta glucan, a nutrient that has well-known health benefits. In some embodiments, the process of the present disclosure may increase yield of beta glucan by up to 80% or more, while generally preserving the native structure of the beta glucan. Preservation of the native structure of beta glucan is important for maintaining full functionality and health benefits of the molecule.

The low temperature processing of the present disclosure also prevents microbial growth, particularly during protease treatment of the fibrous slurry. Low temperatures also minimize, or eliminate, proteolysis of protein during protease treatment. While the chemical mechanism that causes the rapid reduction in viscosity of the fibrous slurry is not clear, the degree of hydrolysis after protease treatment, surprisingly, is practically, or very close to, zero. The benefits of the present process, including increased yield from raw plant material, prevention of microbial growth, minimal proteolysis or nutrient structural change, as well as the elimination of the need for amylase or other enzymes during high temperature processing, are significant improvements over existing technology.

DETAILED DESCRIPTION

Figure 1:
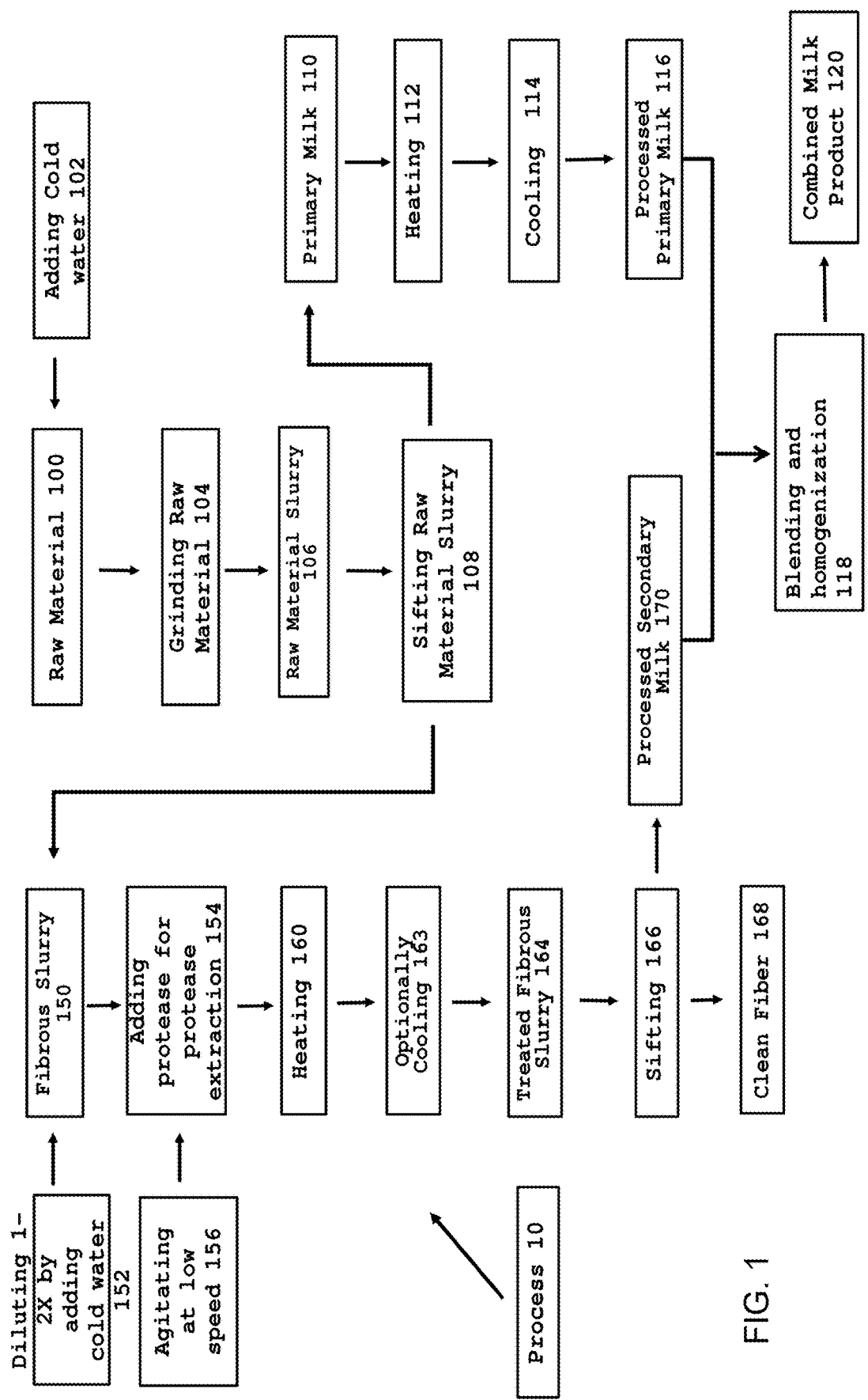
FIG. 1 shows a flow chart illustrating one embodiment of the process, in accordance with the present disclosure.

In the following description, various embodiments of the present disclosure will be described in detail. However, such details are included to facilitate understanding of the present disclosure and to describe exemplary embodiments for implementing the present disclosure. Such details should not be used to limit the disclosure to the particular embodiments described because other variations and embodiments are possible within the scope of the disclosure. The contents of all references, patents and published patent applications cited throughout this application are expressly incorporated herein by reference. Results may vary somewhat from different experiments, as would be expected by one of ordinary skill in the art.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting. All references to percent are by weight, unless otherwise indicated. The details of one or more embodiments of the invention are set forth in the accompanying drawings and the description below. Other features, objects, and advantages of the invention will be apparent from the description and drawings, and from the claims.

Furthermore, although numerous details are set forth in order to provide a thorough understanding of the present disclosure, it will be apparent to one skilled in the art that these specific details are not required in order to practice the present disclosure. In other instances, details such as, well-known methods, types of data, protocols, procedures, processes, etc. are not described in detail.

The present disclosure relates to a protease treatment for increasing yield from plant material by extracting nutrients from the fibrous waste portion, or fibrous slurry, of milled plant material while preserving the nutritional and functional qualities of the extracted material for use as a food product. The process preserves the quality of the extracted material by utilizing low temperatures and minimal protease activity and digestion time during extraction. In some embodiments, the process of the present disclosure is used in combination with an aqueous wet milling process for producing plant based milks. In some embodiments of the process of the present disclosure, total nutrient yield from wet milled grain may be increased by approximately 8-10%.

The process results in a secondary milk product that may be added to the primary milk product, thereby in some embodiments increasing the total milk yield from grain, such as oat, by approximately 9-10% and from nuts, such as almond, by approximately 5%. It is believed that these numbers could increase be increased in an industrial setting where commercial use of this process can be accomplished utilizing industrial filtering and grinding systems. The process increases the yield of protein, fat, fiber, carbohydrates and ash from the grain or nut.

In one embodiment of process 10, as shown in FIG. 1, aqueous wet milled oat grain is filtered at low temperature to produce a primary plant based milk. This step involves size reduction of grains, nuts or seeds by wet milling in cold water to form a primary slurry, followed by sifting of resulting primary slurry through a mesh. A fibrous slurry 150 remains on the filter as a retentate. Fibrous slurry may also be referred to as a fibrous retentate or fiber fraction. Throughout processing in accordance with the present disclosure, the fibrous slurry 150 may be maintained at a low temperature slightly above 0° C. The fibrous slurry 150 may then be transferred to a tank and maintained at low temperature. The diluted fibrous slurry 150, or retentate, is then treated with protease, which may preferably be NEUTB endoprotease BIO-CAT, which may then be added to the diluted fibrous slurry for reaction at low temperatures of between approximately 0° and 5° C. A low temperature reaction, where proteolysis activity is negligible or undetectable, protects the native structure of the protein, thereby maintaining the functionality of the native protein.

As shown in FIG. 1, raw material 100, which may include grains, nuts or seeds, is added to cold water 102, which may be 7° C., and ground or milled 104 to reduce the size of the raw material 100. Size may be reduced, in some embodiments, to <1 mm at 7° C. Grinding 104 produces a raw material slurry 106. After filtering, fibrous slurry 150 is separated from the primary milk. The fibrous slurry has a viscosity and texture that prevents passage of the material through the mesh filter. Raw material slurry 106 may be sifted 108 through #60-400 mesh, or more preferably through #80-160 mesh, or more preferably through #100-140 mesh, or more preferably an approximately US #120 mesh, at 10° C. to separate the primary milk 110 fraction, which may be comprised mainly of starchy, white, soft endosperm constituents, from fibrous slurry 150 fraction.

The sifting step separates the primary milk (the filtrate) from the viscous, coarse, generally insoluble fraction of the primary slurry (the retentate). Sifting may also be referred to interchangeably with filtering in the present disclosure. The primary milk consists primarily of starchy, white, soft endosperm constituents. The viscous retentate likely consists primarily of fiber-protein aggregates and structural seed components from the aleurone and subaleurone layers, or bran, and parts of the hard, clear endosperm.

The fibrous slurry, which may be approximately 40% total solids, may then be diluted with cold water to approximately 5-15% total solids and briefly mixed or milled prior to enzyme treatment. Grinding, or milling of the fibrous slurry 150 and raw material 104 and sifting raw material 108 are generally performed at below protein denaturation temperatures. Sifting raw material 108 results in primary milk 110 and fibrous slurry 150.

Primary milk 110 may, in some embodiments, be produced and processed according to known methods, examples of which are described in U.S. Pat. No. 7,678,403 to Mitchell. As shown in FIG. 1, primary milk 110 may be heated 112 to up to 99° C. at a rate of 6° C. per minute. In the next step, primary milk 110 may then be cooled 114 rapidly to 71° C. Cooling 114 produces a processed primary milk 116.

In addition to primary milk 110, sifting of the raw material slurry 108, as previously described, generates a fibrous slurry 150 retentate. The fibrous slurry 150, which may be, in some embodiments, comprised primarily of bran material, is subjected to enzyme-assisted extraction to extract the nutrients from fibrous slurry 150. Prior to protease treatment, fibrous slurry 150 may be diluted. Protease extraction 154, according to the present disclosure, includes the treatment of the fibrous slurry 150 by adding a protease 154, which may in some embodiments, be a bacterial or fungal neutral metalloendoprotease or in abbreviation "neutral protease" (neutral protease may herein be used interchangeably with Neutrase® endoprotease NOVOZYMES or Neutral Protease L™).

For protease extraction, cold water 152, generally at approximately between 0 and 25° C., may be added to fibrous slurry 150, followed by addition of neutral protease 154. The fibrous slurry 150 containing the protease may then be agitated at low speed 156. Importantly, the protease extraction 154 is performed at suboptimal conditions, which are generally below the established working temperature or pH range for the protease, preferably between 0° C. and 15° C., or more preferably between 0° C. and 5° C. Additionally, in some embodiments, protease extraction 154 from fibrous slurry 150 may be performed for a short duration, which may be, in some embodiments as short as 10 minutes at 10° C.

As previously discussed, conventionally, protease extraction of nutrients is typically performed under optimal, or near optimal, protease activity conditions. Optimal protease activity conditions, however, are not optimal for preserving nutrients and plant milk products in ideal states. Higher temperatures and longer incubation times will degrade nutrients, thereby reducing their quality.

Figure 2:
FIG. 2 shows a chart illustrating the relative activity of Neutral Protease L™ with respect to temperature, in accordance with one embodiment of the present disclosure.
Figure 3:
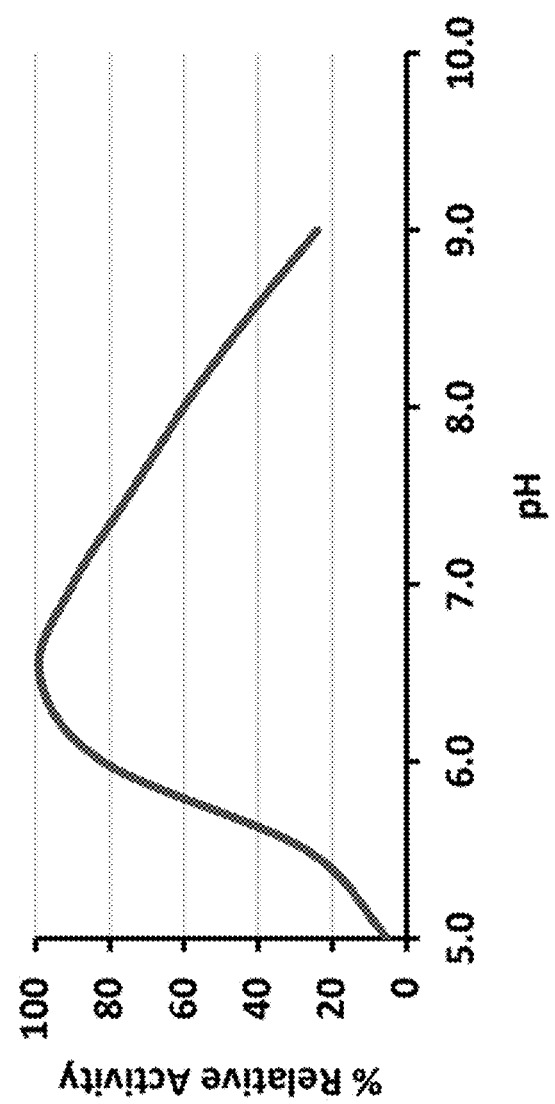
FIG. 3 shows a chart illustrating the relative activity of Neutral Protease L™ with respect to pH, in accordance with one embodiment the present disclosure.

FIG. 2 shows the effect of temperature on activity of neutral protease L (NEUTB endoprotease BIO-CAT) endoprotease from BIO-CAT. As shown in FIG. 2, NEUTB endoprotease BIO-CAT is expected to be minimally active at 10° C. Accompanying this graph, BIO-CAT lists a temperature range of 30° C.-70° C. with an optimum temperature of 55° C. FIG. 3, also published by BIO-CAT, shows that NEUTB endoprotease BIO-CAT is expected to be substantially inactive at pH<5.0. Accompanying this graph, BIO-CAT lists a pH range of 5.5-9.0 with an optimum pH of 6.5. Novozymes® has published similar data on the activity of Neutrase® endoprotease NOVOZYMES. Therefore, based on the data presented herein, and without being bound by theory, it may be postulated that there may significant atypical protease activity causing extraction and a corresponding nutrient yield increase under severely suboptimal conditions. This atypical activity could involve a disruption of cellular structures through means other than hydrolysis of large protein molecules to smaller molecules through protease activity.

Figure 4:
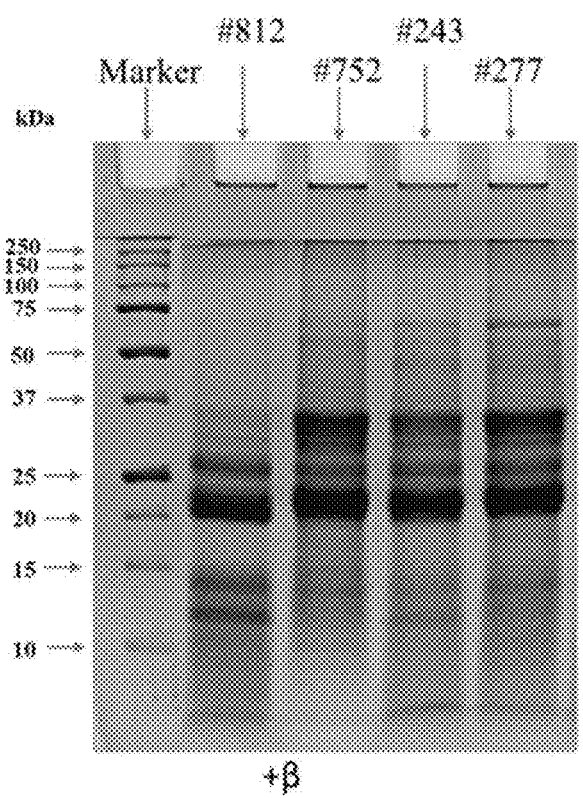
FIG. 4 shows a reducing SDS-PAGE gel indicating protein size and degree of hydrolysis, in accordance with one embodiment of the present disclosure.

FIG. 4 shows the effect that protease extraction in accordance with the present disclosure has on the molecular structure of oat protein from the fibrous slurry at high and low temperatures. These temperature conditions correspond to conditions under which the samples shown in the SDS-PAGE gel of FIG. 4 were treated, as shown and further described in detail in Example 6 and Table 10.

Figures 5A, 5B:
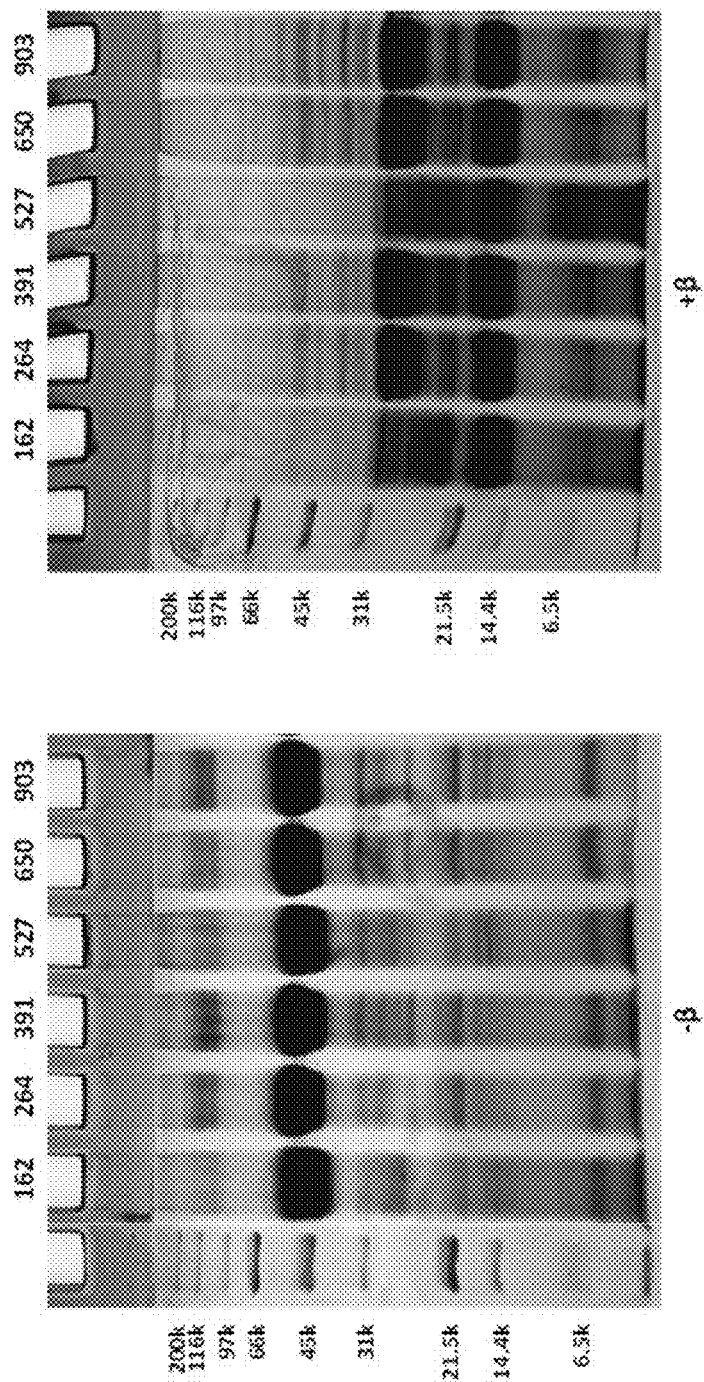
FIG. 5A shows a non-reducing SDS-PAGE gel indicating protein size and degree of hydrolysis, in accordance with one embodiment of the present disclosure.
FIG. 5B shows a reducing SDS-PAGE gel indicating protein size and degree of hydrolysis, in accordance with one embodiment of the present disclosure.

FIGS. 5A and 5B further show the effect that protease extraction in accordance with the present disclosure has on the molecular structure of oat protein from the fibrous slurry under various conditions. The data from Table 13 is taken from the data of FIGS. 5A and 5B, which show SDS-PAGE of samples of protease digested oat fibrous slurry in accordance with the present disclosure. Test samples and a control are shown, where the test samples were treated with various protease or alpha amylase under reducing and non-reducing conditions. Lane 162 is treated with ALKP, lane 264 is treated with NEUTB endoprotease BIO-CAT, lane 391 is treated with TRY1, lane 527 is treated with PAPN, lane 650 is a no-enzyme control, and lane 903 is treated with AAMY. The data from FIGS. 5A and 5B is discussed in greater detail in Example 9 and data is shown in Table 13. Degree of Hydrolysis (DH) was calculated as previously described and SDS-PAGE was performed generally as previously described herein.

Figure 6:
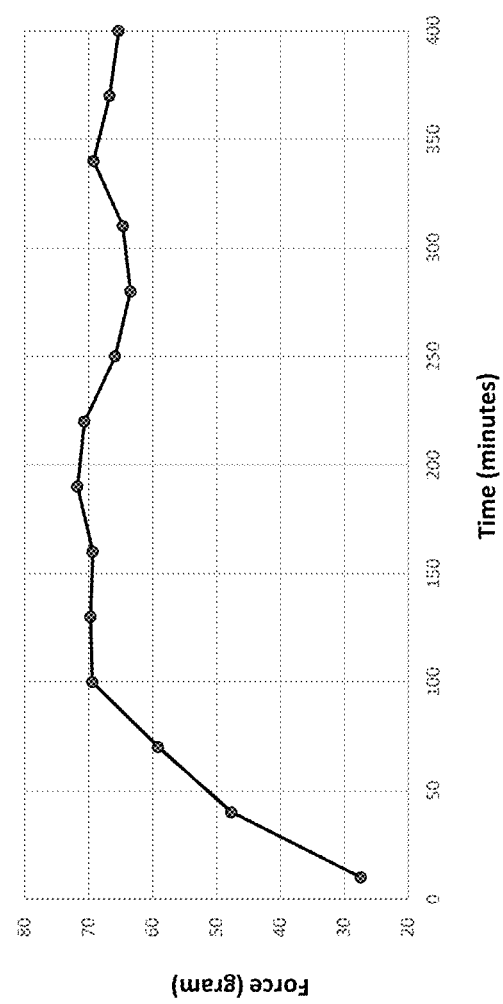
FIG. 6 shows a graph of viscosity increase in an oat fibrous slurry at low temperature, in accordance with one embodiment of the present disclosure.

FIG. 6 shows viscosity changes of oat fibrous slurry over time stored at 2° C. After wet grinding or wet milling and initial filtering with mesh, the fibrous slurry, which is a retentate, will become more viscous over time during storage. The data shown in FIG. 6 is for oat fibrous slurry stored at 2° C., as this temperature is a preferred temperature for avoiding microbial growth and maintaining nutrient structure, prior to and during treatment with protease in accordance with the present disclosure. Generally, the process has been tested herein where viscosity has reached its plateau prior to addition of protease, although other embodiments are considered within the scope of the present disclosure.

Figure 7:
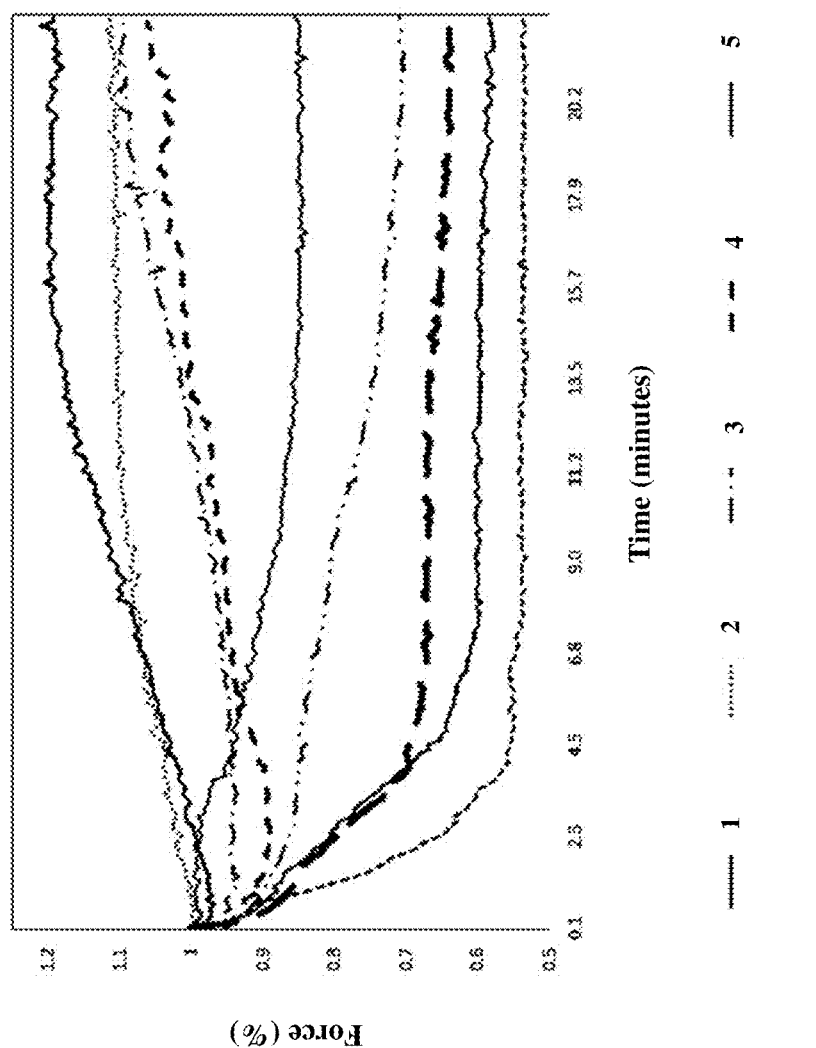
FIG. 7 shows a graph of viscosity change in an oat fibrous slurry at low temperature after enzyme treatment, in accordance with one embodiment of the present disclosure.

FIG. 7 shows viscosity changes in oat fibrous slurry treated with various protease after the fibrous slurry has been stored at 2° C. for 100 min. prior to being treated with protease at 2° C. In the legend of FIG. 7, 1=NONE709, 2=BRML652, 3=FLZM137, 4=TRY5595, 5=AAMY711, 6=ALKP270, 7=TRY1790, 8=NEUTN570, and 9=NEUTB352. FIG. 7 shows representative test samples from a larger set of data which is described in greater detail in Example 10 and Table 14 below. Example 10 discloses the effects of a wide variety of proteases on the viscosity of an oat fibrous slurry. Table 14 shows relative viscosity changes of oat fibrous slurry treated with various enzymes at 2° C. Viscosity reduction is a main factor in promoting the processing of the fibrous slurry and generally correlates with yield increase in accordance with the present disclosure.

Figure 8:
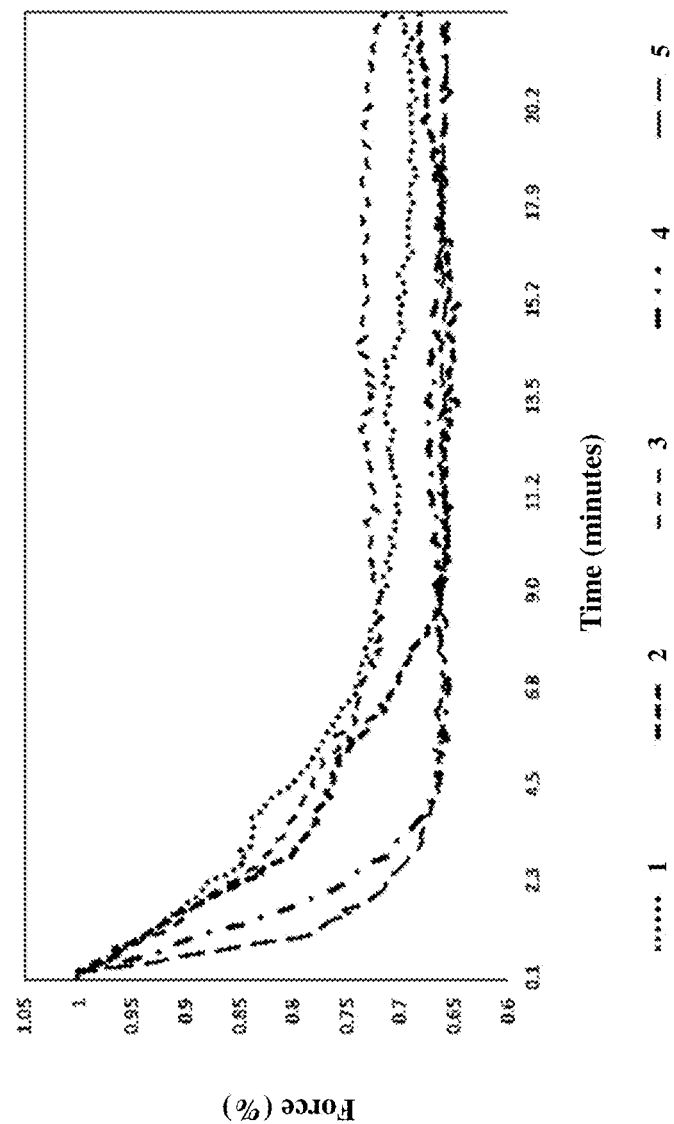
FIG. 8 shows a graph of viscosity change in an oat fibrous slurry at low temperature after neutral protease L™ treatment at different enzyme concentrations, in accordance with one embodiment of the present disclosure.

FIG. 8 shows viscosity changes in oat fibrous slurry treated with NEUTB endoprotease BIO-CAT at different protease concentrations after the fibrous slurry has been stored at 2° C. for 100 min. prior to being treated with protease at 2° C. In the legend of FIG. 8, 1=NEUTB0005, 2=NEUTB0025, 3=NEUTB005, 4=NEUTB01, and 5=NEUTB05. The data from FIG. 8 is discussed in greater detail in Example 11 and Table 15, which disclose the relative viscosity changes of oat fibrous slurry treated with Neutral Protease L (NEUTB endoprotease BIO-CAT) at different enzyme concentrations at 2° C.

Figure 9:
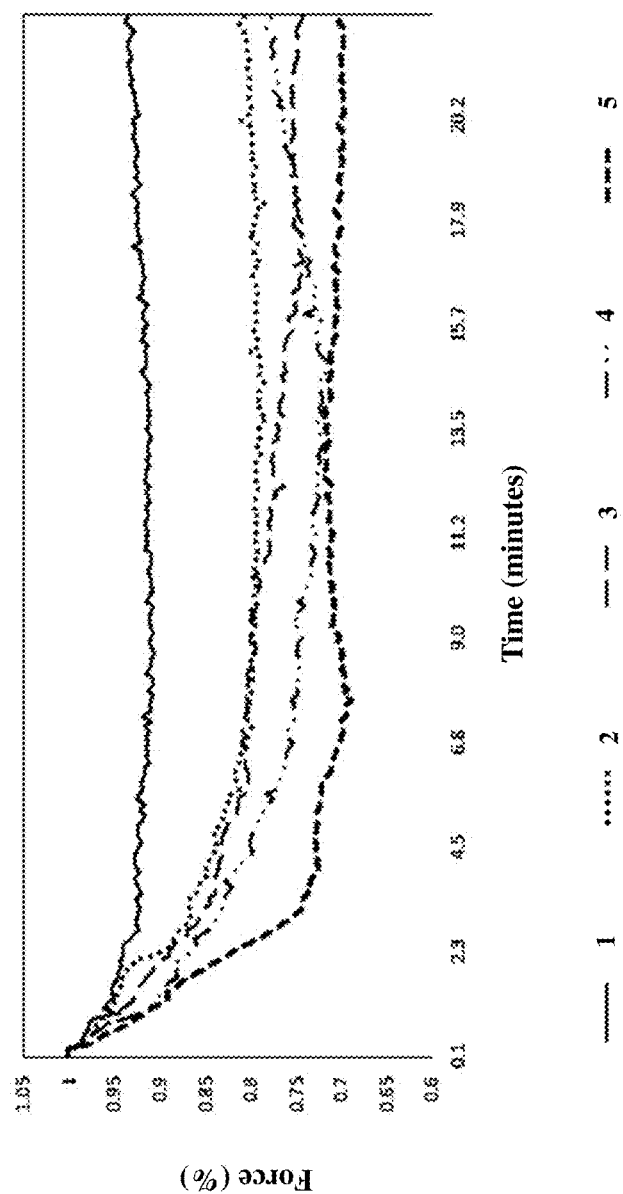
FIG. 9 shows a graph of viscosity change in an oat fibrous slurry at low temperature after microbial trypsin treatment at different enzyme concentrations, in accordance with one embodiment of the present disclosure.

FIG. 9 shows viscosity changes in oat fibrous slurry treated with microbial trypsin at different protease concentrations after the fibrous slurry has been stored at 2° C. for 100 min. prior to being treated with protease at 2° C. In the legend of FIG. 9, 1=TRY1005, 2=TRY10025, 3=TRY1005, 4=TRY101, and 5=TRY105. The data from FIG. 9 is discussed in greater detail in Example 12 and Table 16, which disclose the relative viscosity changes of oat fibrous slurry treated with TRY1 at different enzyme concentrations at 2° C.

Taken together, the data show that, surprisingly, addition of certain proteases to fibrous slurry 150 (FIG. 1) results in a rapid and substantial decrease in viscosity at very low temperature and extreme pH. The viscosity reduction from NEUTB endoprotease BIO-CAT, which may be added at a standard usage rate, or lower, is substantial and unexpected, considering the low temperature of the substrate fibrous slurry 150. In some embodiments, the viscosity reduction, after less than ten minutes of enzyme reaction time, is sufficient to allow filtering of the retentate to produce a secondary plant based milk having a unique nutrition profile. Without enzyme treatment the diluted fibrous slurry remains highly viscous and slimy, and, in practical terms, unprocessable for most applications, including production of plant based milk.

Surprisingly, according to the process of the present disclosure, a majority, or substantial portion, of nutrients present in fibrous slurry 150 can be efficiently extracted at low temperatures under suboptimal, or severely suboptimal, protease activity conditions, as defined in the present disclosure; conditions where the protease is expected to be minimally active or completely inactive. The incubation temperatures of the present disclosure may range, in one embodiment and without limitation, from between 0° C. and 25° C., although lower temperatures may be preferred. Incubation times during low temperature extraction may range, in one embodiment and without limitation, from between 1 minute and 1 hour, or more preferably, between 2 minutes and 30 minutes. Protease treatment at a pH below the expected minimum for protease activity, such as below pH 5.0, also surprisingly resulted in extraction of substantial amounts of nutrients from fibrous slurry 150, even in conjunction with very low temperatures.

In some embodiments, the rapid reduction in viscosity at 2° C. caused by treatment with NEUTB endoprotease BIO-CAT or Microbial Trypsin 154 in accordance with the present disclosure allows for rapid combined processing of multiple batches of fibrous slurry 150 collected at different time points during commercial processing. The low incubation times at low temperatures for protease treatment 154 in accordance with the present disclosure prevent microbial growth while earlier batches of fibrous slurry 150 are stored and allow for rapid reduction in viscosity when the combined batches are treated prior to high temperature processing for extended shelf life or aseptic products.

Proteases, like many enzymes, may catalyze more than one type of reaction. Some secondary activities occur under different conditions and may have a different working range of temperatures and pH relative to the primary enzyme activity. For example, many proteases, in addition to protease activity, are known to have plastein formation activity. (Sun et al. 2021; Xu et al. 2014). Without being bound by theory, it is possible that Neutrase® endoprotease NOVOZYMES and Microbial Trypsin have secondary activities that are responsible for the observed rapid reduction in viscosity at low temperatures and low pH.

Protease extraction followed by minimal to moderate digestion/hydrolysis of protein. Protease treatment, in some embodiments, may be combined with other enzymes, such as amylase, to hydrolyze and dissociate proteins effectively and thoroughly from strongly bound other structural seed components, such as cell wall polysaccharide. Optionally an amylase or a mix of amylases can be added to the fibrous slurry 150.

In some embodiments, fibrous slurry 150 may be diluted with cold water 1-2× 152 prior to protease treatment 154. In some embodiments, to deactivate the enzyme, fibrous slurry 150 may be heated 160 to 99° C., or in some embodiments to between 75° C. and 99° C., at a rate of 6° C. per minute. In some embodiments heat inactivation may be by direct or indirect steam treatment for rapid inactivation. Fibrous slurry 150 may then be cooled rapidly to 82° C. to produce treated fibrous slurry 164. In some embodiments, heating 160 may be rapid, such that the enzyme is deactivated substantially without significant incubation time at a temperature range at which the protease is active. The product may be optionally cooled 163 after heating 160. In some embodiments, this may be accomplished by steam heating, which may include steam injection, or direct and indirect steam heating. Alternative methods of rapid heating, including microwave, may also be used, as would be known to one of ordinary skill in the art.

Treated fibrous slurry 164 may then sifted 166 through #60-400 screen to produce processed secondary milk 170, which may also be referred in the tables as secondary milk or $2^{nd}$ milk, and clean fiber 168. The clean fiber 168 produced from this process may be substantially free of macro nutrients such as proteins and fats and may consist primarily of insoluble fibers. The clean fiber 168 is a byproduct of the process of the present disclosure, and may have value in food and other applications.

The processed secondary milk 170 may then be combined with processed primary milk 116, after blending and homogenization 118, to produce a combined milk 120 or combined milk product 120. Alternatively, processed primary milk 116 and processed secondary milk 170 milks can used separately.

The processed secondary milk 170 derived from the fibrous slurry 150 according to the process of the present disclosure contains a substantial amount of the protein, fat, ash and carbohydrates found in the fibrous slurry. Separation of the protein, fiber, fat and carbohydrates in the fibrous slurry 150 leads to increased yield by allowing these components to disperse and solubilize in water, thereby forming the processed secondary milk 170. Further, a decrease in viscosity caused by the protease may allow for increased flow of nutrient material through the mesh during sifting 166, also leading to an increased nutrient yield in the processed secondary milk 170.

Processed secondary milk 170 can be combined with processed primary milk 116 or used separately. When processed primary milk 116 and processed secondary milk 170 are combined, combined milk 120 has a higher yield, enhanced functionality in some cases, and additional nutrients that may be present primarily in the fibrous portions of the grain and in fibrous agglomerations in nuts. The examples and tables below show that a pre-milking protein hydrolysis process, as described by Conrad, improved yield significantly in oats in comparison to a mechanical process alone.

The milks produced according to the present disclosure did not have a bitter taste, while plant based milk produced according to the Conrad process had a bitter aftertaste. Further, plant based milk produced by the process of Conrad had impaired functionality with regard to foamability and foam stability when compared to the wet milled, mechanical process and the process of the present disclosure.

The process of the present disclosure improved the yield of milks in all tested products, although the effect was greater in certain material. Without being bound by theory, the present process appears to effectively segregate most soluble, small and medium molecular mass proteins into the primary milk fraction, and segregates proteins that are tightly bound to cell wall constituents in aleurone and subaleurone layers into the secondary milk. Therefore, the present disclosure improves milk yield significantly in comparison to the prior art, while minimizing the undesirable impacts of treating all milled plant material with protease.

Further, the present disclosure limits the generation of free amino acids and peptides and small mass protein molecules that create undesirable sensory characteristics in the products. The present disclosure may prevent primary, secondary and tertiary reactants (i.e. browning) from reacting with other constituents in the seeds. Further, the process according to the present disclosure produces a clean fiber 168 byproduct that can be used in foods and other applications.

Additional advantages of the process according to the present invention include short processing times for extraction, which increases profitability in an industrial setting. Further, the low temperatures and low pH prevents microbial growth during processing.

In one embodiment, the present disclosure, particularly with the neutral proteases effective in the present disclosure, can be effective with low or high pH substrates, such as oxidized oat grain. During oat processing, oats that have been stored for longer tend to become oxidized and therefore have a lower pH, which may cause a full 1 point reduction in pH. Most grains are alive or certain enzymes are still active in deactivated grains that result in reactions that decrease the pH of the grain. Further, pH adjustment may occur during processing for various reasons, and the efficacy of the present disclosure at low and high pH may be useful in certain embodiments. In some embodiments, waste products could be treated by the present disclosure, such as spent barley grain, or other waste products that have higher or lower pH.

In some embodiments, an effective temperature range for a protease reaction in accordance with the present disclosure may be between 0° C. and the upper denaturation temperature of proteases that are effective in the present disclosure. In some embodiments, effective temperatures for protease reaction in accordance with the present disclosure may be between 0° C. and the upper activity range of proteases that are effective in the present disclosure.

In some embodiments, effective temperatures for protease reaction in accordance with the present disclosure may be suboptimal temperatures, wherein suboptimal is defined to mean below the suggested range provided in publications from protein suppliers, or other publications, or as would be expected to be used by those of ordinary skill in the art. In some embodiments, an effective temperature range for protease reaction in accordance with the present disclosure may be between 0° C. and 80° C., or between 0° C. and 70° C., or between 0° C. and 60° C., or between 0° C. and 50° C., or between 0° C. and 40° C., or between 0° C. and 35° C., or between 0° C. and 30° C., or between 0° C. and 25° C., or between 0° C. and 20° C., or between 0° C. and 15° C., or between 0° C. and 12° C., or between 0° C. and 10° C., or between 0° C. and 9° C., or between 0° C. and 8° C., or between 0° C. and 7° C., or between 0° C. and 6° C., or between 0° C. and 5° C., or between 0° C. and 4° C., or between 0° C. and 3° C., or between 0° C. and 2° C., or between 0° C. and 1° C.

In some embodiments, an effective temperature range for maintaining materials used in accordance with the present disclosure, when not intentionally heating these materials for enzyme deactivation or microbial reduction, may be between 0° C. and 50° C., or between 0° C. and 40° C., or between 0° C. and 35° C., or between 0° C. and 30° C., or between 0° C. and 25° C., or between 0° C. and 20° C., or between 0° C. and 15° C., or between 0° C. and 12° C., or between 0° C. and 10° C., or between 0° C. and 9° C., or between 0° C. and 8° C., or between 0° C. and 7° C., or between 0° C. and 6° C., or between 0° C. and 5° C., or between 0° C. and 4° C., or between 0° C. and 3° C., or between 0° C. and 2° C., or between 0° C. and 1° C.

In some embodiments, an effective pH range for a protease reaction in accordance with the present disclosure may be between approximately 3.5 and 12, or between approximately 4 and 12, or between approximately 4.5 and 12, or between approximately 3.5 and 11, or between approximately 4 and 11, or between approximately 4.5 and 11, or between approximately 4.5 and 10, or between approximately 4.5 and 9, or between approximately 4.5 and 8, or between approximately 4.5 and 7, or between approximately 4.5 and 6.5, or between approximately 5 and 8, or between approximately 5 and 7, or between approximately 5 and 6, or between approximately 6 and 7, or between approximately 6 and 8.

In some embodiments, an effective incubation period for a protease reaction in accordance with the present disclosure may be between 1 minute and 10 minutes, or between 2 minutes and 10 minutes, or between 5 minutes and 10 minutes. In some embodiments, an effective incubation period for a protease reaction in accordance with the present disclosure may be between 1 minute and 20 minutes, or between 2 minutes and 20 minutes, or between 5 minutes and 20 minutes. In some embodiments, an effective incubation period for a protease reaction in accordance with the present disclosure may be between 1 minute and 30 minutes, or between 2 minutes and 30 minutes, or between 5 minutes and 30 minutes. In some embodiments, an effective incubation period for a protease reaction in accordance with the present disclosure may be between 1 minute and 45 minutes, or between 2 minutes and 45 minutes, or between 5 minutes and 45 minutes. In some embodiments, an effective incubation period for a protease reaction in accordance with the present disclosure may be between 1 minute and 60 minutes, or between 2 minutes and 60 minutes, or between 5 minutes and 60 minutes. In some embodiments, an effective incubation period for a protease reaction in accordance with the present disclosure may be between 1 minute and 90 minutes, or between 2 minutes and 90 minutes, or between 5 minutes and 90 minutes. In some embodiments, an effective incubation period for a protease reaction in accordance with the present disclosure may be between 1 minute and 120 minutes, or between 2 minutes and 120 minutes, or between 5 minutes and 120 minutes. In some embodiments, an effective incubation period for a protease reaction in accordance with the present disclosure may be between 10 seconds and 4 hours.

In some embodiments, effective conditions for the protease reaction of the present disclosure are conditions which result in limited protein hydrolysis, or a low degree of hydrolysis (DH) as defined in the present disclosure, which may also be referred to as a coefficient of protein degradation, as has been previously described herein. In some embodiments, a low DH sufficient for the process of the present disclosure is a DH that does not result in a noticeable, or significant, or negative, or substantially negative, change in the taste of a final product, where the change in taste is caused by proteolysis; and where, in some embodiments, the final product may be a secondary plant based milk, or, in some embodiments, may be a combination of a primary plant based milk and a secondary plant based milk, or a combination of the secondary milk, or a dried or concentrated version of the secondary milk, and any other food product.

In some embodiments an acceptable DH, as defined herein, for the purposes of the present disclosure may be less than 5%, or less than 1%, or less than 2% or less than 3% or less than 4%, or less than 6%, or less than 7%, or less than 8%, or less than 9%, or less than 10%, or less than 11%, or less than 12%, or less than 13%, or less than 14%, or less than 15%.

Proteases that may be effective in addition to those disclosed in the examples include Neutral Metalloprotease (M4 class). In some embodiments, heat-labile neutral bacterial proteases known in the art may be used in accordance with the present disclosure. Heat labile means that the enzyme is susceptible to irreversible deactivation at relatively moderate temperatures as would be appreciated by a person skilled in the art. An enzyme having a substrate cleavage specificity defined as P1=Leu, Val or Phe residue may be used, where P1 is the residue on the N-terminal side of the scissile bond. Suitable heat labile bacterial neutral proteases include those derived from a *Bacillus* spp., in particular *Bacillus subtilis* or *Bacillus amyloliquefaciens*. In a specific aspect, a method of the invention comprises the use of a neutral protease which is marketed by NovoZymes® under the tradename Neutrase® endoprotease NOVOZYMES, in particular Neutrase® endoprotease NOVOZYMES 0.5 L, or an enzyme with similar properties. In a specific aspect, this enzyme may be NEUTB endoprotease BIO-CAT, marketed by BIO-CAT. In some embodiments, the metalloendoprotease (EC. 3.4.24) may be Neutrase® endoprotease NOVOZYMES or Maxazyme endoprotease NNP DS® DKSH (EC. 3.4.24.28; bacillolysin).

Neutrase® endoprotease NOVOZYMES is a trademark owned by Novozymes Biopharma US Inc. for a protease. Neutrase® endoprotease NOVOZYMES is a metalloprotease currently derived by Novozymes from *Bacillus amyloliquefaciens* (also known to be derived from *Bacillus subtilis*). Neutrase® endoprotease NOVOZYMES may have CAS Number: 9080-56-2. Neutrase® endoprotease NOVOZYMES has specificity mainly for leucine and phenylalanine (Kunst, 2003). Neutral protease refers to a class of proteases that act as catalysts in a neutral, weakly acidic, or weakly alkaline environment. Its optimal pH is between 6.0 and 7.5, and can catalyze the hydrolysis of peptide bonds of proteins, releasing amino acids or peptides.

Neutral proteases often have the advantage of fast reaction rate and wide adaptability to reaction conditions. According to Novozymes, Neutrase® endoprotease NOVOZYMES for animal protein extraction is a high quality broad-spectrum endo-protease. It provides a mild hydrolysis. It's often used in isolation in the hydrolysis process but can also be combined with an exo-protease for superior flavor benefits. Available strengths (range) 0.8-1.5 AU-N/g. Hydrolysis action: Less aggressive. Generation of peptides or single amino acids: Peptides. Debittering: No. Savory flavor generation: Yes. Working pH range*: 6-9. Working temperature range (° C.)*: 30-65. Quality grade: Food grade. (https://biosolutions.novozymes.com/en/animal-protein/products/neutrase).

NEUTB endoprotease BIO-CAT is provided by BIO-CAT, 9117 Three Notch Road Troy, VA 22974 (https://www.bio-cat.com/). BIO-CAT describes Neutral Protease L (NPL or NEUTB endoprotease BIO-CAT) as being useful for both animal and plant protein hydrolysis. BIO-CAT further describes NPL as being useful for decreasing viscosity of fish or chicken by-products on its product information page for NPL. BIO-CAT produces hydrolysates with reduced bitterness compared to alkaline proteases and states that NPL is food grade. According to the product information sheet, BIO-CAT NPL has a CAS #76774-43-1 and EC #3.4.24.28. According to an NIH website, the substance name for CAS #76774-43-1 is: Proteinase, *Bacillus* neutral. (https://chem.nlm.nih.gov/chemidplus/rn/76774-43-1). EC #3.4.24.28 is listed on Expasy, the Swiss Bioinfomatics Resource Portal at the Swiss Institute of Bioinformatics, as Bacillolysin, and, alternatively, *Bacillus metalloendopeptidase, Bacillus subtilis* neutral proteinase and Megateriopeptidase. The reaction catalyzed is listed as similar, but not identical, to that of thermolysin. Variants of this enzyme have been found in species of *Bacillus* including *B. subtilis, B. amyloliquefaciens, B. megaterium, B. mesentericus, B. cereus* and *B. stearothermophilus*. The enzyme belongs to peptidase family M4. Formerly EC 3.4.24.4. NEUTB endoprotease BIO-CAT may have an activity range of NLT 1,600 AZO/g. The source of NEUTB endoprotease BIO-CAT is listed in some publications as *Bacillus amyloliquefaciens*. The form of NEUTB endoprotease BIO-CAT is liquid.

Neutrase® endoprotease (Novozymes®) and NEUTB endoprotease BIO-CAT are metalloproteases, a subgroup of neutral proteases, derived from *Bacillus amyloliquefaciens*, and are members of the M4 thermolysin family of proteases. Metalloproteases depend on the presence of divalent metal cations and can be inactivated by dialysis or metal chelates. X-ray crystallography studies have shown that most metalloproteases form a site for metal binding in the enzyme structure during crystal formation. The metal cation is usually $Zn^{2+}$, and also may be other metal cations, such as $Mg^{2+}$ and $Cu^{2+}$. The metal ion at the active site of the enzyme can be chelated by a chelating agent such as EDTA, so that the enzyme loses its partial or full activity. This process is usually reversible and the enzyme activity can recover by re-adding metal ions. In some embodiments of the present disclosure, proteases may be bacterial neutral metalloproteases or fungal neutral metalloproteases according to their sources.

Bacterial neutral proteases are the most commonly used neutral proteases in the market, especially those produced by *Bacillus*, such as *Bacillus subtilis* and *Bacillus licheniformis*. The enzyme activity of bacterial neutral protease mostly depends on divalent cations, such as $Mg^{2+}$, $Zn^{2+}$, and $Ca^{2+}$. Bacterial protease has strong hydrolysis ability, quick react rate, and the hydrolyzed product has less bitterness, so it has been widely used in the food industry.

Fungal neutral protease sources include *Aspergillus oryzae, Rhizopus,* and *Mucor*. The catalytic pH of the fungal protease is wide (usually 4 to 11). *Aspergillus oryzae* can produce acidic proteases, neutral proteases, and alkaline proteases. The production of fungal proteases is mainly through solid-state fermentation. Their activity of protease is mainly dependent on divalent cations which can be affected by metal chelates. In general, the react rate and stability of fungal proteases are relatively lower than bacterial proteases.

In some embodiments of the present disclosure, certain microbial trypsin proteases have been shown to be effective. In particular, and in general, these include bacterial and fungal trypsin. *Aspergillus melleus* and *Bacillus subtilis* may be sources of microbial trypsin effective in the present disclosure. The bacterial and fungal trypsins are included within the chymotrypsin family S1. Other sources of trypsin may also be effective, and therefore, any bacterial or fungal trypsin that is effective in the present disclosure is considered as being within the scope of the present disclosure.

In general, proteases claimed in the present disclosure may have similar or equivalent effects to other proteases that are not listed in the present disclosure, but may be known or discoverable to those of ordinary skill in the art, and any of these proteases having similar or equivalent effects, for the purposes of the present disclosure, are considered to be within the scope of the present disclosure.

In some embodiments proteases that are effective according to the present disclosure may be combined with other enzymes. In some embodiments, these combinations may be between enzymes that are independently effective in accordance with the present disclosure. In some embodiments, these combinations may include one enzyme that is a protease that is independently effective in accordance with the present disclosure and a supplemental enzyme that may not be effective in accordance with the present disclosure. Supplemental enzymes may include amylase, cellulase, hemicellulase, xylanase, lipase, phytase or other enzymes.

In some embodiments of the present disclosure, the material being treated may not be plant based. In some embodiments, the material to be treated may be sewage. In some embodiments, the material to be treated may be meat. In some embodiments, the material may be food material other than plant based food. In some embodiments, the material may be pet food. In some embodiments, the material to be treated may be beta glucan containing microbial organisms or fungi. Throughout the application, the use of the term milk should include any liquid produced according to the process of the present disclosure, regardless of whether the product is edible.

In some embodiments, the process of the present disclosure may include heat treatment of the protease treated material to reduce or eliminate microbial contamination. In some embodiments, heat treatment may be an aseptic treatment. In some embodiments, heat treatment may be an ultra-high temperature treatment (UHT). In some embodiments, heat treatment may be at a temperature sufficient for pasteurization. In some embodiments, heat treatment may be sufficient to produce an extended shelf life (ESL) product.

In some embodiments, heat treatment for enzyme deactivation may be approximately 90° C., or approximately 85° C., or approximately 80° C., or approximately 75° C., or approximately 70° C.; wherein, in some embodiments the heat treatment for enzyme deactivation will result in sufficient liquefaction of the treated material such that the treated material may be processed at high heat for microbial reduction or elimination without clogging elements of the processing equipment including pipes or heat exchangers; wherein, in some embodiments the protease being deactivated is a neutral protease shown to be effective in the present disclosure, including NEUTB endoprotease BIO-CAT; and wherein, in some embodiments alpha amylase, or any non-protease enzymes are not required for sufficient liquefaction for further processing.

In one embodiment, the present disclosure may be considered a process for effectively extracting beta glucan and protein from cereal grains such as oat and barley, and potentially other beta glucan containing organisms, while maximizing protection of the native structure of the beta glucan and protein molecules. When compared to known methods of wet milling or dry milling oat or barley to produce a nutritional beverage or plant based milk where high viscosity, fibrous material is discarded, the present disclosure may utilize this material to more than double the amount of beta glucan yield from the grain, as shown in Table 11, while also nearly doubling the protein yield from the grain, as shown in Table 8. In addition to beta glucan and protein, the present process also extracts other valuable nutrients from the fibrous portion of the grain, many of which are found only in this material. The secondary milk is low in starch, which may be advantageous as a low carbohydrate beverage.

EXAMPLES

Materials and methods used in the examples of the present disclosure are disclosed herein below.

Fibrous Slurry Preparation

The fibrous slurry is generally prepared as described herein for each of the examples below, where applicable. Generally, approximately 100 g, 200 g, 250 g or 300 g of raw material including grains, nuts or seeds was weighed and washed with approximately 2× amount of ice cold water (i.e. 400 mL for 200 g grains), and the water was drained through a strainer.

Washed raw material was placed in a 64 oz Vitamix® blender cup with a wet blade, Model VM0135 (Vitamix® Corp., Cleveland, OH, U.S.A.). To the washed raw material, 4× amount of ice cold water (i.e. 765 g for 200 g raw material), a calculated amount of CaCl2, CaCO3, and/or alpha-amylase (DSM, Parsippany, NJ, U.S.A.) were added to the blender cup. Then, the mixture was blended at high speed (10/10 setting) with a Vitamix® TurboBlend 4500 (Model VM0197, Vitamix® Corp., Cleveland, OH, U.S.A.) for 2 minutes.

The primary slurry was filtered through a US #120 mesh screen using a 5.5"×3.75" straight edge plastic bowl scraper. Most of the milk was filtered through by moving the scraper at 30-40° angle on the surface of the screen in a circular motion, and a gentle pressure was applied to the fiber with the scraper in flat to squeeze milks out of the retentate at the end until the retentate solid contents to approximately 35%. For some experiments, the milking process, which includes washing, blending and sifting were repeated, depending on the needs for different slurries. In some embodiments the yield of the primary milk was calculated at approximately 67% on dry substance bases in the case of oat.

To the approximately 125 grams of fibrous slurry (i.e. from 200 gram oat grain), 300 mL (1.5× to the initial grain weight) ice cold water was added. The slurry mix was placed back in the Vitamix® blender cup, and blended at high speed (10/10) for 30 seconds using the Vitamix® TurboBlend 4500.

In some embodiments, for example, the diluted blended fibrous slurry had approximately 10.8% total solids (i.e. oat). In some embodiments, 400 mL (2× to the initial grain weight) ice cold water was added. In some embodiments, 2× water was added to a diluted fibrous slurry having approximately 8% total solids.

In some embodiments, where the effects of pH on enzyme activity and viscosity changes of fibrous slurry were determined, the pH of the fibrous slurry was adjusted by adding anhydrous citric acid or 50% KOH solution to the blended slurry prior to the 100 minutes storage in a refrigerator (1.7° C.).

The slurry was placed in a beaker, covered and left in a refrigerator (1.7° C.) for 100 minutes undisturbed until further texture, viscosity and other analyses.

Enzyme Inactivation

In some cases, enzyme inactivation for the primary milk was generally performed by heating in a water bath to 77° C. for 15-20 minutes span followed by heating to a boil in a microwave, unless otherwise indicated. Alternatively, in some cases, enzymes were inactivated by injecting high pressure steam using Nuova Simonelli® Appia II V GR™1 to 80° C. for 1 minute followed by heating to a boil in a microwave.

Filtering Treated Fibrous Slurry

After protease treatment of the fibrous slurry, the treated fibrous slurry was filtered through a mesh by the same methods as previously described for filtering the primary milk.

Texture Analysis

Texture analysis was generally performed as described below for each of the examples, where applicable. The fibrous slurry was stored in a walk-in refrigerator for 100 minutes (grain or nut slurries) or 30 minutes (chicken skin slurry) and then mixed with a hand held blender (Oster®, PN: 181439 Rev B) at a speed set 1/low for 10 seconds prior to place in an acrylic back extrusion cup (25 mm (i.d.)×100 mm high, Texture Technologies Corp.™, South Hamilton, MA, U.S.A.).

One hundred fifty grams (150 g) of fibrous slurry was placed in the acrylic back extrusion cup. The height of one hundred fifty grams (150 g) of fibrous slurry in the acrylic back extrusion cup was approximately 72 mm.

Total solid, pH prior to the addition of enzymes, and viscosity were measured.

The extrusion cup with a sample was placed in a 1.8° C. ice water bath for a texture analysis. Then, pre-calculated amounts of enzymes were added to the slurry to the top at the right before the test started. In the case of the chicken skin experiment, warm (49° C.) or hot water bath (60° C.) was used.

Back extrusion setup with a 40 mm disk (Texture Technologies, Inc.™, South Hamilton, MA, U.S.A.) was used to get the compression and mixing during the viscosity change measurement.

A TA.XTPlus C Texture Analyzer by Texture Technologies Co.™ (South Hamilton, MA, U.S.A.) operated with Exponent Connect Version 8.0.7.0.™ software was used to measure the force to compress the oat fiber slurry.

The maximum force to compress the oat slurry from 70 mm to 5 mm at a rate of 20 mm/second was measured using a 5 kg lead cell. The data collection continued for up to 200 cycles, and the peak compression force for each peak was measured and used to access the rate and changes in viscosity from enzyme treatments.

From the raw data only peak compression forces for each cycle were extracted, and used for further analyses.

For oat retentate slurry, it was observed that the viscosity of slurry continuously increased up to approximately 100 minutes (FIG. 5). Therefore, any texture change measurement on the grains/nuts retentate slurry using the texture analyzer was done after storing the slurry in a walk in refrigerator (1.7° C.) for 100 minutes. To test each enzyme, a fresh slurry was prepared from grains/nuts, stored for 100 minutes and an appropriate test parameter was applied, and the texture changes were measured by the texture analyzer.

For texture analysis, in some embodiments, the slurry was stored in a walk-in refrigerator for 100 minutes for grain and nut slurries, 30 minutes for chicken skin slurries, or overnight for protein isolate and concentrate slurries.

Viscosity Measurement:

Viscosity measurement was generally performed as described herein for each of the examples below, where applicable. Grains/nuts retentate slurries, chicken skin slurries, and milked bases cooled to 1-2° C. in an ice water bath or kept in a walk in refrigerator were transferred into beakers and placed in a 1.7° C. ice-water bath, and left in the bath for 10 minutes to get samples and the ice-bath temperature equilibrated. The ice bath temperature was monitored and maintained a constant temperature by adding water or ice.

A sample beaker was removed one at a time from the sample ice-ice bath, placed into another ice-water bath maintained at 1.7° C. under the viscometer. Then, the viscosity of the sample mix was measured with Brookfield® RVT Series Viscometer™ (Brookfield Engineering Laboratories Inc.®, Middleboro, MA) equipped with #3, 4 or 5 round disk probe while the sample tube was in the ice-water bath. The viscometer speed was either 50 or 100 rpm, and the viscosity was converted into centipoise (cPs) from a table provided by the viscometer manufacturer. Three readings were collected and averaged for a viscosity.

The viscosity was measured at 1.7° C. in an ice water bath to minimize the variation between samples and to minimize viscosity variations particularly rate variation during warming up the refrigerated samples to a higher temperature (i.e. room temperature, 21° C.).

Organoleptic Evaluation of Milks and Other Products

Approximately 30 mL of milk or other products were assigned a three digit random number assigned was placed in 3 oz Solo cups. Expert panel member(s) evaluated and rated the overall quality of milks and product using 9 point quality scale.

Lowest quality-Highly unacceptable with lots of off flavors and taste aspects such as smells, bitterness, sourness, salty, astringent, throat scratching, darker or different in color, slimy, viscous in texture, etc. In addition, it includes samples with low to no sweetness, lack of intended flavor (i.e. oat flavor in oat milk). Medium quality: Neither acceptable nor unacceptable. Highest quality: Highly acceptable without off notes, high intensity of intended flavor, right level of sweetness, mouthfeel, and good color.

Between samples panel members washed their palate with distilled water, unsalted saltine crackers, and waited for minimum of 3 minutes until the palate is clean without any residual off notes from the previous sample evaluation.

In some cases, organoleptic quality was evaluated using 9 point quality scale. A score of 1 represents the lowest quality product having many off notes and inferior qualities, and a score of 9 given to the highest quality product having no off notes, a high intensity of intended flavor, a desired level of sweetness and mouthfeel, and good color.

Protein Isolate and Protein Concentrate Analysis

Protein isolates and concentrates used for analysis were used without any modification. Appropriate amount of protein powders and cold ice water were weighed out to produce approximately 10% or 20% solid slurries. The water and protein powder mix was the blended/mixed at high (10/10 setting) speed for 2 minutes using the Vita-Mix TurboBlend 4500. The slurry was placed in a walk-in refrigerator (1.7° C.) overnight (minimum of 16 hours) to fully hydrate the protein.

Degree of Protein Hydrolysis (DH)

Degree of protein hydrolysis, or coefficient of protein degradation (CPD), was generally measured as described herein for each of the examples below, where applicable. Total solid and protein content of the samples were measured using an Ohaus MB90 Moisture analyzer (Parsippany, NJ), and by a Dumas method using a NDA 701 Dumas Nitrogen Analyzer (Velp Scientific, Inc.®, Bohemia, NY) using a conversion factor 6.25.

The samples were diluted to a protein concentration of 4 mg/mL, then dissolved in an equal volume of sodium dodecyl sulfate-polyacrylamide gel electrophoresis (SDS-PAGE) sample buffer, with or without 2-mercaptoethanol (2-ME), and heated in a boiling water for 3 minutes.

After cooling of the samples to room temperature, the solutions were centrifuged at 2000×g for 5 minutes to remove non-protein particles.

Purchased precast gels from Bio-Rad® Lab. (Hercules, CA, U.S.A.), or SDS-PAGE gels (separating gel: 12% acrylamide; stacking gel: 5% acrylamide) prepared based on an established procedures were used. The electrophoresis was performed by a developed procedure in a third party lab, who performed the SDS-PAGE analysis.

Molecular weight standards were purchased from Sigma-Aldrich Co.® All chemical reagents and organic solvents were purchased from Sigma-Aldrich®. Quantification of individual protein bands (pixel and %) was done from the SDS-PAGE images using a digitizing analysis software.

The Degree of Hydrolysis in oat milks was determined from the relative quantity changes (% increase) of the peptide quantity having molecular weight less than 25 kDa in reducing SDS-PAGE gels containing 2-mercaptoethnol.

Calculation of Substances

All material measurements were calculated on a dry substance bases (DSB) unless specified otherwise.

Foam Quality

Foam quality was generally measured as described herein for each of the examples below, where applicable. pH measured final milks were diluted to 10% solid milk by adding distilled water and blended.

One hundred grams (100 g) of each milk was placed in a Nespresso® Milk Frother (Nespresso® USA Inc., New York, NY), and foamed.

Warm foamed samples were placed in 400 mL graduated beakers, and the volume and the quality of foam were observed and recorded.

From the volume of the foam/liquid and quality of the foam, the foam quality was converted and rated between 1 and 5.

(1) Poor quality foam: Volume of milk/foam mix after foaming being 100-120 mL and the size of bubbles are big and collapse quickly.

(2) Below average: Volume of milk/foam mix after foaming being 120-150 mL and the size of bubbles are big and collapse quickly.

(3) Average: Volume of milk/foam mix after foaming being 125-175 mL with a mixture of big micro bubbles and collapse moderately.

(4) Above Average: Volume of milk/foam mix after foaming being 150-200 mL with mostly micro foams and collapse slowly.

(5) Excellent: Volume of milk/foam mix after foaming being >200 mL with mostly micro foams and collapse slowly.

Materials

Materials used in the present disclosure are listed herein below.

Alkaline-Protease (*Bacillus licheniformis*), Bromelain (*Ananas comosus*, Pineapple), Fungal Protease A (*Aspergillus niger*), Fungal Protease A2 (*Aspergillus niger*), Fungal Protease HU (*Aspergillus oryzae*), Neutral Protease L™ (*Bacillus amyloliquefaciens*), Opti-Ziome NPL a.k.a. Neutral Protease (*Bacillus subtilis*), OPTI-Ziome Pro-ST, Papain (*Carica papaya* (Papaya), Protease AM (*Aspergillus melleus*), Trypsin Microbial (*Aspergillus melleus* & *Bacillus subtilis*), and Xylanase (*Trichoderma longibrachiatum*) were obtained from BIO-CAT (Troy, VA). Trypsin-Microbial (Microbial Trypsin) from BIO-CAT is the product name for a product containing oryzin (a subtilisin) from *Aspergillus melleus* and bacillolysin from *Bacillus amyloliquefaciens*. Alkaline-Protease-Bacterial (Alkaline Protease L) from Bio-Cat is the Bio-Cat product name for subtilisin A from *Bacillus licheniformis*. Bacterial amylase was purchased from DSM® (Parsippany, NJ). α-Chymotrypsin (Bovine pancreas), Carboxypeptidase A (Bovine pancreas), Proteinase K (*Tritirachium album*), Thermolysin (*Geobacillus stearothermophilus*), Trypsin Type-I (Bovine pancreas) and Trypsin Type-II-S (Porcine pancreas) were purchased from MiliporeSigma® (Burlington, MA, U.S.A.). Flavourzyme® endoprotease NOVOZYMES (*Bacillus licheniformis* & *amyloliquefaciens*) and Neutrase® endoprotease NOVOZYMES (*Bacillus amyloliquefaciens*) were obtained from Novozymes® (Franklinton, NC, U.S.A.). Calcium Carbonate (CaCO3) was purchased from Specialty Minerals Inc.™ (Adams, MA). Citric acid anhydrous was purchased from Fisher Chemical® (Fair Lawn, NJ). Calcium Chloride ($CaCl_2$)) was purchased from Avantor Performance Material Inc.® (Center Valley, PA). Potassium Hydroxide (KOH) was obtained from Mallinckrodt Pharmaceuticals® (Hampton, NJ). Chickpea protein isolate (Plantec™, item SP24000) was obtained from Socius Ingredient LLC®, Evanston, IL, U.S.A.). Pea protein (Puris 870 MV) was obtained from World Food Processing LLC™ (Turtle Lake, WI, U.S.A), and 80% isolate (YPVCP-80C) from Yantai T Full Biotech Co.™ (Zhaoyuan, Shandong, China).

Table 1 contains a list of enzymes used in the present disclosure, including abbreviations, vendors and additional information.

TABLE 1

| Abbreviation | Name | (Source) | Vendor | Notes |
| --- | --- | --- | --- | --- |
| ALKP | Alkaline Protease | (*Bacillus licheniformis*) | BIO-CAT | pH 7-10, 25-70° C. |
| AAMY | α-Amylase | | DSM | |
| CHTR | α-Chymotrypsin | (Bovine pancreas) | MILIPORE SIGMA | pH 7.5-8.5, 30-60° C. (50° C. Opt) |
| BRML | Bromelain | (*Ananas comosus*, Pineapple) | BIO-CAT | 2.4GDU/mg, pH 4-9, 35-65° C. |
| CBPT | Carboxypeptidase A | (Bovine pancreas) | MILIPORE SIGMA | pH 7-8 |
| FLZM | Flavourzyme ® endoprotease | (*Bacillus licheniformis* & *amyloliquefaciens*) | NOVOZYME | pH 4-8, 30-65° C. |
| FGPTA | Fungal Protease A | (*Aspergillus niger*) | BIO-CAT | 800HUT/mg, pH 3-6.5, 30-70° C. |
| FGPTA2 | Fungal Protease A2 | (*Aspergillus niger*) | BIO-CAT | 75 HUT/mg, pH 3-6.5, 30-70° C. |
| FGPTHU | Fungal Protease HU | (*Aspergillus oryzae*) | BIO-CAT | 400HU/mg, pH 2-11, 30-70° C. |
| NEUTB/NPL | Neutral Protease L ™ | (*Bacillus amyloliquefaciens*) | BIO-CAT | NLT 1.6 AZO/mg, pH 5.5-9, 30-70° C. |
| NEUTN | Neutrase ® endoprotease | (*Bacillus amyloliquefaciens*) | NOVOZYMES | pH 6-9, 30-65° C. |
| NEUTATKL | Autoclaved Neutral Protease L ™ | (*Bacillus amyloliquefaciens*) | BIO-CAT | NLT 1.6AZO/mg, pH 5.5-9, 30-70° C. |
| NONE | No enzyme added | | | |
| NEUTBS | Opti-Ziome NPL a.k.a Neutral Protease | (*Bacillus subtilis*) | BIO-CAT | NTL 0.2 NU/mg, pH 5.0-11, pH 9 Optimum, 30-70° C., 50° C. Optimum |
| OZPST | OPTI-ziome Pro-ST | | BIO-CAT | pH 3-9, 20-70° C. |
| PAPN | Papain | (*Carica papaya* (Papaya)) | BIO-CAT | 800TU/mg, pH 4-10, 25-70° C. |
| PTAMHUT | Protease AM | (*Aspergillus melleus*) | BIO-CAT | 25HUT/mg, pH 5.5-10, 30-55° C. |
| PRK | Protenase K | (*Tritirachium album*) | MILIPORE SIGMA | pH 7.5-12, 20-65° C. (50-60° C. Optimum) |

TABLE 1-continued

| Abbreviation | Name | (Source) | Vendor | Notes |
|---|---|---|---|---|
| THERL | Thermolysin | (Geobacillus stearothermophilus) | MILIPORE SIGMA | pH 7-9, 65-85° C. |
| TRY1 | Trypsin Microbial | (Aspergillus melleus & Bacillus subtilis) | BIO-CAT | 20HUT/mg, pH 5-8, 30-60° C. |
| TRY4 | Trypsin Type-I | Bovine pancreas) | MILIPORE SIGMA | 10000 BAEE unit/mg protein, T8003-100 mg, Lypolized powder |
| TRY5 | Trypsin Type-II-S | (Porcine pancreas) | MILIPORE SIGMA | T7409-1G, Lypolized powder, Type-II-S, 1000-2000 unit/mg dry sold |
| TRY1ATKL | Autoclaved Microbial Trypsin | (Aspergillus melleus & Bacillus subtilis) | BIO-CAT | 20HUT/mg, pH 5-8, 30-60° C. |
| XYL | Xylanase | (Trichoderma longibrachiatum) | BIO-CAT | 50XU/mg |

With regard to Example 1, specifically, 200 g of various plant materials were washed with 1× amount of ice cold water, hand mixed and drained through a strainer, as shown in Tables 1-3. Washing was repeated two additional times. The plant material was placed in a blender cup (Vitamix®). 600~800 mL of ice cold water, 100-400 microliters of alpha-amylase (AAMY, DSM), 60 mg or $CaCl_2$) and 100-200 mg of CaCO3 was added. The mixture was blended at high speed (10/10 setting) for 2 minutes to form a primary slurry.

The primary slurry was filtered through #100 or #120 mesh screen to separate the primary milk from the fibrous slurry retentate. The primary milk was covered and stored in a refrigerator. The fibrous slurry portion was transferred into the blender cup. To the fibrous slurry was added 333 mL to 400 mL cold water (2° C.) and 66 mg of a neutral protease L (NEUTB endoprotease, BIO-CAT). The mixture was blended at high speed (10/10) for 30 seconds and placed in a refrigerator (2° C.) for 0.5 to 1 hour.

After cold storage of the protease and slurry mix, 50-200 microliters of an alpha-amylase (AAMY, DSM) was added (amylase is optional in some embodiments). The primary milk and treated fibrous slurry were heated separately in a water bath up to 76.7° C. for 15-20 minutes (about 6° C. per minute), and further heated to boil in a microwave to inactivate the enzymes. The primary milk was cooled down to 71° C. in a water bath, and kept warm in a water bath (60° C.). In the case of oat, from 200 g grain and 800 g water approximately 775 grams of primary milk was collected and the primary milk sold content was 15% (the remaining 225 g was in the fibrous slurry retentate). This calculation shows a yield of about 58%. Additional washing and grinding cycles (108 in FIG. 1) may vary results, however, additional washing and grinding cycles add cost through time and energy increases and may be undesirable in practical terms. The process of the present disclosure reduces the need for additional washing and grinding cycles and improves efficiency.

The fibrous slurry was cooled down to 82° C. and filtered through #100 or #120 mesh screen (washing). To the washed fibrous slurry portion additional 333 or 400 mL of cold water was added, and the mix was blended for a 30 seconds. The blended mix was filtered through #100 or #120 mesh screen to produce a secondary milk. For oat secondary milk, from 200 g grains by the mechanical process the amount was 640 g and the solid in the milk was 5% respectively. In the case of oat secondary milk from 200 g grains by neutral protease L (NEUTB endoprotease BIO-CAT) treated process (the invention) the amount was 600 g and the solid in the milk was 8%, respectively. (Heating to deactivate caused loss of moisture by steam evaporation to give 600 g versus 640 g of the previous sample).

The resulting secondary milk was mixed with the primary milk. The combined milk, at 60° C., was homogenized at 2000 PSI (1500 psi in a 1st stage, 500 psi in a 2nd stage) using a GEA Niro Sovavi™ homogenizer and placed in a refrigerator. The pH and the total solid content of the homogenized milk was measured. Organoleptic and other functional properties of milk and finished products containing milk including baristas, creamers and lattes were evaluated, as shown in Table 5. The remaining fiber fraction on the mesh screen was placed in a drying pan and dried at 93.3° C. in an oven for approximately 16 hours until dry (<10% moisture content).

TABLE 2

|  | Test 1 | Test 2 | Test 3 | Test 4 | Test 5 | Test 6 |
|---|---|---|---|---|---|---|
| Oat (g) | 200 | 200 | 200 | 200 | 200 | 200 |
| Oat Moisture (%) | 12.77 | 12.77 | 12.77 | 12.77 | 12.77 | 12.77 |
| α-Amylase (%) | 0.10 | 0.05 | 0.10 | 0.05 | 0.10 | 0.05 |
| NEUTB (%) | 0 | 0 | 0.033 | 0.033 | 0.017 | 0.033 |
| $CaCl_2$ (%) | 0.03 | 0.03 | 0.03 | 0.03 | 0.03 | 0.03 |
| $CaCO_3$ (%) | 0.05 | 0.05 | 0.05 | 0.05 | 0.05 | 0.05 |
| Total # of Washes | 3 | 3 | 3 | 3 | 3 | 3 |
| Fibrous Slurry Processing | No | No | No | No | Yes | Yes |
| Incubation Temp (° C.) | n/a | n/a | 57 | 57 | 5-2 | 5-2 |

TABLE 2-continued

|  | Test 1 | Test 2 | Test 3 | Test 4 | Test 5 | Test 6 |
|---|---|---|---|---|---|---|
| Incubation Time (min) | n/a | n/a | 30 | 30 | 30-60 | 30-60 |
| Screen (#) | 120 | 100 | 120 | 100 | 120 | 100 |
| Yield | 86.51 | 84.45 | 94.06 | 92.91 | 91.97 | 94.14 |

Table 2 discloses oat milking procedure protocols and milk yield. The fibrous slurry was prepared as previously described. Test samples 1 and 2 were prepared using a mechanical process only. Test samples 2 and 3 had enzyme added and without separation. Test samples 5 and 6 had enzyme added and with separation. Measurements were calculated based on initial raw material weight. Yield is measured on a dry substance basis.

TABLE 3

|  | Test 1 | Test 2 | Test 3 | Test 4 | Test 5 | Test 6 |
|---|---|---|---|---|---|---|
| Chickpea (g) | 200 | 200 | 200 | 200 | 200 | 200 |
| Chickpea Moisture (%) | 10.5 | 10.5 | 10.5 | 10.5 | 10.5 | 10.5 |
| alpha-Amylase (%) | 0.2 | 0.1 | 0.2 | 0.1 | 0.2 | 0.1 |
| NEUTB (%) | 0 | 0 | 0.033 | 0.033 | 0.017 | 0.017 |
| $CaCl_2$ (%) | 0.03 | 0.03 | 0.03 | 0.03 | 0.03 | 0.03 |
| $CaCO_3$ (%) | 0.10 | 0.05 | 0.10 | 0.05 | 0.10 | 0.05 |
| Total # of Washing | 3 | 3 | 3 | 3 | 3 | 3 |
| Fibrous Slurry Processing | No | No | No | No | Yes | Yes |
| Incubation Temp (° C.) | n/a | n/a | 57 | 57 | 5-2 | 5-2 |
| Incubation Time (min) | n/a | n/a | 30 | 30 | 30-60 | 30-60 |
| Screen (#) | 120 | 100 | 120 | 100 | 120 | 100 |
| Yield | 79.35 | 74.97 | 79.09 | 78.4 | 84.22 | 80.03 |

Table 3 discloses chickpea milking procedure protocols and milk yield. The fibrous slurry was prepared as previously described. Test samples 1 and 2 were prepared using a mechanical process. Test samples 2 and 3 had enzyme added and without separation. Test samples 5 and 6 had enzyme added and with separation. Measurements were calculated based on initial raw material weight. Yield is measured on a dry substance basis.

TABLE 4

|  | Test 1 | Test 2 | Test 3 | Test 4 | Test 5 | Test 6 |
|---|---|---|---|---|---|---|
| Almond (g) | 200 | 200 | 200 | 200 | 200 | 200 |
| Almond Moisture (%) | 4.5 | 4.5 | 4.5 | 4.5 | 4.5 | 4.5 |
| alpha-Amylase (%) | 0.05 | 0.05 | 0.05 | 0.05 | 0.05 | 0.05 |
| NEUTB (%) | 0 | 0 | 0.033 | 0.033 | 0.017 | 0.017 |
| $CaCl_2$ (%) | 0.03 | 0.03 | 0.03 | 0.03 | 0.03 | 0.03 |
| $CaCO_3$ (%) | 0.10 | 0.05 | 0.10 | 0.05 | 0.10 | 0.05 |
| Total # of Washing | 3 | 3 | 3 | 3 | 3 | 3 |
| Fibrous Slurry Processing | No | No | No | No | Yes | Yes |
| Incubation Temp (° C.) | n/a | n/a | 57 | 57 | 5-2 | 5-2 |
| Incubation Time (min) | n/a | n/a | 30 | 30 | 30-60 | 30-60 |
| Screen (#) | 120 | 100 | 120 | 100 | 120 | 100 |
| Yield | 83.07 | 83.7 | 84.7 | 86.68 | 88.49 | 88.33 |

Table 4 discloses almond milking procedure protocols and milk yield. The fibrous slurry was prepared as previously described. Test samples 1 and 2 were prepared using a mechanical process. Test samples 2 and 3 had enzyme added and without separation. Test samples 5 and 6 had enzyme added and with separation. The oat creamer was evaluated in pH 5.11 hot coffee. The barista basis was evaluated in a foamer. The Almond Latte was made with barista base and coffee. Measurements were calculated based on initial raw material weight. Yield is measured on a dry substance basis.

TABLE 5

| | Tests 1&2 (A) | Tests 3&4 (B) | Tests 5&6 (C) |
|---|---|---|---|
| Milked Oat | Strong oat notes. Superior mouth coating when compared to B and C. Slightly sweeter than B and C. | Thinnest in texture, most neutral in flavor and least oat-like base. | Very neutral in flavor, slight mouth coating and snotty texture, and some metallic bitterness when compared to A and B. Similar in taste to B. |
| Oat Creamer | Feathered in 2 minutes. Feathered the fastest, but not significantly faster than B and C. | Feathered in 2 minutes and at the second fastest rate. | Feathered in 2 minutes but slower than A and B. Minor but positive improvement over A and B. |
| Oat Barista | White foam color, the best micro foam. Has some large bubble formation. | Tan (darker) foam color, worst foam density and bubble size. | Slightly tan foam color, the second best micro foam with big bubbles. Good foam volume but the lowest foam quality when compared to A and B. |
| Milked Chickpea | Strong earthy, starchy and chickpea flavors. Heavy in texture and mouthfeel. | Cleanest flavor without any mouth coating. Slightly starchy. Has some fruity and metallic off notes. | Strong earthy, chickpea flavor notes not as strong as in mechanical only. Some cooked, sulfur and bitter off notes. |
| Milked Almond | Raw almond flavor and slimy in texture. | Watered down taste. Thinnest in texture, and darkest in color. Bitter aftertaste. | Slightly darker in color than A. Similar in taste to B, but no watered down taste. |
| Unsweetened Almond Milk-Formula | Thick, gritty and fatty. Strong tannin taste, and lack of cooked notes. | Thin in texture and refreshing. Watered down taste. | Sweeter, fatty and waxy. Clean in taste. Roasted almond notes. The best tasting product when compared to A and B. |
| Almond Barista | Same volume as B and C. Good micro foam. | Similar in volume, but foam has more bigger bubbles, and breaks faster. The lowest quality foam when compared to A and C. | Similar to A. |
| Almond Latte | Strong raw almond and peanut like flavor. | Good nutty almond flavor, but has some fishy notes and bitterness. | Most neutral in taste. Good foam quality. Slight nutty notes and peanut off notes. |
| Milked Chickpea | Strong chickpea and earthy off notes. Heavy, starchy mouthfeel. | Clean, neutral and no mouth coating. Slightly starchy and has some fruity and metallic off notes. | Earthy, strong chickpea notes, but not as strong as in A. Some cooked, sulfur and bitter off notes. The most neutral in taste. |

Table 5 discloses sensorial and functional properties of milks and products made from milked bases. The fibrous slurry was prepared as previously described. Test samples 1 and 2 were prepared using a mechanical process only. Test samples 2 and 3 had enzyme added and without separation. Test samples 5 and 6 had enzyme added and with separation. The oat creamer was evaluated in pH 5.11 hot coffee. The barista basis was evaluated in a foamer. The almond latte was made with barista base and coffee.

Example 1 showed that protease recovery of nutrients from the fibrous slurry is substantial at below 10° C. and that organoleptic properties could be improved, in some cases, by the process of the present disclosure.

Example 2

As shown in Table 6, different groups of enzymes were tested with the fibrous slurry for ability to increase yield for oat milk in accordance with the methods of the present disclosure. Protease, amylase and xylanase were tested at the suboptimal enzyme activity temperature of 10° C. Alpha amylase (AAMY), neutral protease L (NEUTB endoprotease BIO-CAT) and xylanase (XYL) were compared to a control with only alpha amylase. Table 6 shows oat milk recovery from various enzyme treated fibrous slurry at below its optimum activity temperature (10° C.).

For the control, 200 g of oat grain was washed with ice cold water three times, and the water was drained. The washed grains were combined with 800 mL of ice cold water, 100 ul of alpha amylase (DSM, AAMY), 60 mg or CaCl$_2$) and 100 mg of CaCO3 in a blender cup (Vitamix®). The mixture was blended at high (10/10 setting) speed for 2 minutes to produce a primary slurry. The control was washed with water three times. The control sample substantially reproduced wet milling and mechanical extraction processes used in test samples.

In test sample 1, an additional 60 mg of alpha-amylase, or 0.03% of the initial grain weight, was added to the sample. In test sample 2, 66 mg of Neutral Protease L (BIO-CAT), or 0.033% of the initial grain weight, was added to the sample. In test sample 3, 66 mg of xylanase (XYL, BIO-CAT), or 0.033% of the initial grain weight.

Test slurries were incubated at 10° C. in a cold water bath for 2 hours with occasional stirring. After 2 hours of incubation, slurries were heated in a water bath to 79.5° C. for 15-20 min., and further heated to boiling in a microwave oven. The heated fiber slurry was washed by filtering through a US #120 mesh screen while hot, at approximately 82° C., and washed again with 400 mL of water and 30 seconds of blending in the Vitamix®. The secondary milk was added to the primary milk. The fiber portion in the retentate after washing was discarded. The amount of total solids in the milk was measured, and recorded to calculate the overall milk yield.

TABLE 6

|  | Control | AAMY | NEUTB | XYL |
| --- | --- | --- | --- | --- |
| Grain Weight (g) | 174.57 | 174.56 | 174.39 | 174.54 |
| Total water used in milking (g) | 1600 | 1600 | 1600 | 1600 |
| # of washings to obtain slurry | n/a | 2 | 2 | 2 |
| Qty of alpha Amylase (mg) | 100 | 120 | 60 | 60 |
| Qty of NEUTB (mg) | 0 | 0 | 66 | 0 |
| Qty of Xylanase to fibrous slurry (mg) | 0 | 0 | 0 | 66 |
| Incubation temperature (° C.) | n/a | 10 | 10 | 10 |
| Incubation time (minutes) | n/a | 120 | 120 | 120 |
| Qty of Solid in Milk (%) | 8.95 | 9.35 | 9.5 | 12.57 |
| Milk Yield % | 84.23 | 87.6 | 95.07 | 80.49 |

The fibrous slurry was prepared as previously described. The control sample used only the mechanical process for extraction. The enzyme abbreviations are listed in a separate table.

Example 2 showed that the yield increase resulting from combined neutral protease and amylase treatment of the fibrous slurry at 10° C. is high, whereas treatment with amylase alone, or amylase combined with xylanase under the same conditions results in a relatively low yield increase.

Example 3

In Example 3, however, samples were tested with neutral protease treatment only, without amylase, and at different suboptimal activity temperatures. Incubation time was also varied. As shown in Table 7, samples were incubated at approximately 4° C., 7° C. and 10° C.

TABLE 7

|  | Control | Test 1 | Test 2 | Test 3 | Test 4 |
| --- | --- | --- | --- | --- | --- |
| Grain weight (g) | 174.57 | 178.95 | 178.86 | 178.81 | 178.84 |
| Total water used in milking (g) | 1600 | 1600 | 1600 | 1600 | 1600 |
| # of washings to obtain slurry | n/a | 2 | 2 | 2 | 2 |
| Qty of alpha Amylase (mg) | 100 | 100 | 100 | 100 | 100 |
| Qty of Neutral Protease (mg) | 0 | 34 | 66 | 66 | 66 |
| Incubation temperature (° C.) | n/a | 7.2 | 4.4 | 10 | 10 |
| Incubation time (minutes) | n/a | 120 | 60 | 60 | 10 |
| Quantity of solid in milk (g) | 9.92 ± 0.73 | 10.43 | 8.94 | 9.53 | 8.80 |
| Milk yield (%) | 83.33 ± 0.09 | 89.96 | 87.37 | 89.72 | 88.22 |

The fibrous slurry was prepared as previously described. The control sample used only the mechanical process for extraction. Weight % was measured on a dry substance basis. 34 mg of NEUTB endoprotease (BIO-CAT) was added to test sample 1, which is 0.173% of the initial grain weight. In test samples 2, 3 and 4, 66 mg of Neutral Protease L (BIO-CAT) was used, which is 0.033% of the initial grain weight. As shown in Table 6, test sample slurries were incubated at different temperatures for different times with occasional stirring.

Example 3 showed the addition of NEUTB endoprotease BIO-CAT into the fibrous slurry increased yield significantly across all the different testing conditions, including varied temperatures, amounts of Neutral Protease L and incubation times. As previously observed, the viscosity of the fibrous slurry was decreased quickly and significantly within a few minutes of incubation at temperatures between 4.4-10° C. Upon heating of the fibrous slurry, viscosity did not increase, and the secondary milk was easily separated from fibrous slurry by filtering. It was observed that the fiber slurry from the test sample 3 (66 mg NEUTB endoprotease BIO-CAT, 10° C., and 60 minutes) was the driest and had the least slimy texture.

NEUTB endoprotease BIO-CAT was effective at reducing the viscosity of the fibrous slurry at different enzyme concentrations, temperatures and incubation times. Yield increases from very low incubation temperature (4.4° C.) and short incubation time (10 minutes) were significantly higher than the control sample.

According to Example 3, the process of the present disclosure utilizing neutral protease L treatment for 10 minutes at 10° C., as shown in the Test 4 lane of Table 7, increased yield by approximately 7-8% of total solids in oat grain as shown in Table 6. The process of the present disclosure for 1 hour at 10° C. provided a yield increase of approximately 9-10% of total solids.

Example 4

As shown in Table 8, yield from NEUTB endoprotease BIO-CAT treated fibrous slurry at below enzyme activity pH and at cold (10° C.) temperature was tested. To further investigate whether activities other than protease activity in NEUTB endoprotease BIO-CAT could be involved in the effects of the present disclosure on yield, the process was carried out at a pH of approximately 4.96-5.3. The results of this test are shown in Table 8. Considering published enzyme activity curves provided by the enzyme supplier BIO-CAT (shown in FIG. 3), at pH 4.5 NEUTB endoprotease BIO-CAT is expected to be inactive or minimally active. The combination of low pH and low temperature shown in Table 7 should essentially inactivate NEUTB endoprotease BIO-CAT.

TABLE 8

|  | Control | Test 1 | Test 2 |
|---|---|---|---|
| Solid in Fibrous Slurry (g) | 35.75 | 35.98 | 37.82 |
| Total Water Added to Slurry (g) | 586.01 | 589.82 | 619.9 |
| # of Washings to obtain slurry | 2 | 2 | 2 |
| Qty of alpha Amylase (mg) | 60 | 0 | 0 |
| Qty of NEUTB (mg) | 0 | 34 | 34 |
| pH of Slurry | 6.54 | 6.54 | 4.96 |
| Incubation temperature (° C.) | 10 | 10 | 10 |
| Incubation time (minutes) | 75 | 75 | 75 |
| Quantity of Solid in Milk (g) | 14.43 | 19.03 | 17.9 |
| Milk Yield (%) | 40.36 | 52.88 | 49.81 |

The fibrous slurry was prepared as previously described. α-amylase was added to the control fibrous slurry, whereas Neutral Protease L (NEUTB endoprotease BIO-CAT) was added to test samples.

The pH of test sample 2 after completion of incubation was 5.3. NEUTB endoprotease BIO-CAT containing slurries (test 1 and test 2) showed significant viscosity reduction after few minutes of addition. The viscosity reduction in non-pH adjusted NEUTB endoprotease BIO-CAT sample (Test 1) was quicker than pH adjusted sample (test sample 2). However, a viscosity reduction in alpha amylase added sample (control) was not observed. In addition, NEUTB endoprotease BIO-CAT treated samples (test 1 and test 2) showed separation and settlement of fiber during the incubation (showed separation of milk on top). In the NEUTB endoprotease BIO-CAT treated fibrous slurry, the slurry became less homogenous, having a whiter top layer and a darker bottom layer. Whereas the alpha amylase treated fibrous slurry maintained homogeneity and a uniform color. This effect correlates with the ease of filtering the NEUTB endoprotease BIO-CAT treated product because it requires little mechanical force to separate the product; gravity alone may be sufficient to filter the product. In some embodiments, particularly commercial embodiments, filtering may be performed by a continuous mechanical sifter. With NEUTB endoprotease BIO-CAT treatment in accordance with the present disclosure, less time and energy may be required by the sifter to filter the fibrous slurry, or in some cases no continuous mechanical sifter may be required.

Example 4 shows that nutrient extraction is high even under pH and temperature conditions thought to prevent or severely inhibit protease activity. The yield from the amylase control sample was 40.36% of the total solids from the fibrous slurry. The yield from the NEUTB endoprotease BIO-CAT treated samples was 52.88% and 49.81% of the fibrous slurry for test samples 1 and 2, respectively.

Example 5

Table 9 shows milked oat recovery from NEUTB endoprotease BIO-CAT treated fibrous slurry at below enzyme activity pH and at cold (10° C.) temperature. To further investigate whether activities other than protease activity in NEUTB endoprotease BIO-CAT could be involved in the observed increase in yield, the present process was carried out at a pH of approximately 4.5. At pH 4.5, as shown in FIG. 3, neutral protease is expected to be inactive or minimally active. The combination of low pH and low temperature, should, in theory, inactivate neutral protease.

TABLE 9

|  | Control | Test 1 | Test 2 | Test 3 |
|---|---|---|---|---|
| Solid in Fibrous Slurry (g) | 34.83 | 35.09 | 34.78 | 34.77 |
| Total Water Added to Slurry (g) | 570.83 | 575.18 | 570.16 | 569.98 |
| # of Washings to obtain slurry | 2 | 2 | 2 | 2 |
| Qty of alpha Amylase (mg) | 60 | 0 | 0 | 0 |
| Qty of NEUTB (mg) | 0 | 34 | 34 | 34 |
| pH of Slurry-Initial | 6.64 | 6.64 | 4.62 | 10.24 |
| pH of Slurry-End point | 6.97 | 6.97 | 4.99 | 9.66 |
| Incubation temperature (° C.) | 10 | 10 | 10 | 10 |
| Incubation time (minutes) | 70 | 60 | 50 | 65 |
| Quantity of Solid in Milk (g) | 12.66 | 17.38 | 14.4 | 14.4 |
| Milk Yield (%) | 36.36 | 49.54 | 41.4 | 50.58 |

The fibrous slurry was prepared as previously described. In Table 8, milk yield % was calculated as the percent of total solids from the fibrous slurry that was incorporated into the secondary milk, rather than the combined secondary and primary milks.

NEUTB endoprotease BIO-CAT added slurries showed significant viscosity reduction a few minutes after addition of the protease: 2 minutes for Test 1, 3 minutes for Test 2 and 5 minutes for Test 3 based on visual observation during the process. The observation was verified in the later examples using a texture analyzer that the significant viscosity reduction in oat fibrous slurry treated with neutral proteases took place within 5 minutes after the addition of enzymes to the retentate at low temperature at 2° C. The viscosity reduction in the neutral, unadjusted NEUTB endoprotease BIO-CAT sample was more rapid than for the pH adjusted samples. No viscosity reduction in alpha-amylase control sample was observed. The viscosity of the basic pH sample showed a very slow reduction of viscosity, but the viscosity dropped quickly close to the end of the digestion. The sudden drop in viscosity in test sample 3 may have been related to the pH moving below 10 during the incubation.

The acidic pH adjusted samples from Table 7 and Table 8 showed a difference in yield increase, where the yield increase was 49.81% for the conditions of Table 7 when compared to 41.4% for the conditions of Table 8. These differences may relate to minor pH changes during the digestion. For the experiment shown in Table 7, the pH of the low pH fibrous slurry ranged from below 5.0 (4.96) at the beginning of the incubation period, to slightly above 5.0 (5.3; data not shown) at the end of the incubation period; whereas the pH of the experiment of Table 8 remained below 5.0 (4.62-4.99) throughout the enzyme digestion of fibrous slurry.

NEUTB endoprotease BIO-CAT is expected to be minimally active at 10° C., as shown in FIG. 2, and, as shown in FIG. 3, neutral protease is expected to be substantially inactive at pH<5.0. Therefore, it may be postulated that there is significant atypical protease activity causing extraction and a corresponding nutrient yield increase. This atypical activity could involve a disruption of cellular structures through means other than hydrolysis of large protein molecules to smaller molecules through protease activity.

Once the pH exceeds 5.0, as it did for part of the low pH treatment as shown in Table 7, in the low pH fibrous slurry samples, proteolysis may become active, or more active, thereby generating a potential synergistic effect with the putative non-proteolytic activity. The synergistic effect may explain the yield increase observed in addition to the yield increase resulting from the putative non-proteolytic activity of NEUTB endoprotease BIO-CAT, as shown in Table 7. The non-proteolytic activity observed at low pH and low temperature with NEUTB endoprotease BIO-CAT could, in theory, relate to secondary enzyme activity, such as plastein activity, which is a known activity in neutral protease. In combination with a secondary activity, proteolytic activity of the protease may synergistically increase yield as a result of a potential synergistic effect between protease and non-protease activities.

The low temperature, low pH experimental data from Table 8 showed that at a pH below 5.0 and at 10° C., the yield increase was approximately 80% of the yield increase when the process was carried out at optimal pH. Thus, the difference between conditions between low protease activity (10° C.) and putatively negligible protease activity (10° C., pH<5) was approximately 20%. This result suggests that a large portion of the yield increase may be related to non-proteolytic enzymatic activity.

Neutral protease is known to have plastein activity that is highly active at 10° C. (Xu et al. 2014) and Dermiki and Fitzgerald (2020) report that plastein synthesis generally requires a pH in the range 3.0-7.0. Without being bound by theory, the plastein reaction is a possible explanation for the efficient extraction at 10° C. and pH~4.8. Since plastein is known to aggregate protein molecules, plastein activity could be attracting proteins and causing them to separate from fibrous material.

Other unknown or unidentified activities of NEUTB endoprotease BIO-CAT or Neutrase® endoprotease NOVOZYMES may also be involved in the observed yield increase. For example, the substrate could be an important factor in the observed effects, such that the reaction may involve protein-fiber interactions such as beta glucan or other fibrous molecules from the cell wall. Regardless of the mechanism, the level of yield increase from the fibrous slurry at suboptimal conditions is unexpected and surprising, given the conditions tested and the known activities of NEUTB endoprotease BIO-CAT under these conditions.

Example 6

Example 6 shows protease extraction of the fibrous slurry at high and low temperatures. These temperature conditions correspond to conditions under which the samples shown in the SDS-PAGE gel of FIG. 4 were treated, as shown in Table 10. The test lanes of the SDS-PAGE gel indicate protein size for the fibrous slurry proteins after protease treatment. The SDS-PAGE gels of FIGS. 4 and 5 show the degree of hydrolysis of the proteins from the fibrous slurry, as well as some insight into the mechanism of action for the protease extraction.

TABLE 10

|  | Control | Test 1 | Test 2 | Test 3 |
| --- | --- | --- | --- | --- |
| Solid in Fibrous Slurry (g) | 87.59 | 79.95 | 81.64 | 85.54 |
| Total Water Added to Slurry (g) | 297.49 | 575.18 | 570.16 | 569.98 |
| # of Washes to get Slurry | 3 | 3 | 3 | 3 |
| Qty of Neutral Protease (mg) | 0 | 66 | 66 | 66 |
| Incubation temperature (° C.) | 10 | 57 | 10 | 57 |
| Incubation time (minutes) | 120 | 120 | 120 | 120 |
| Quantity of Solid in Milk (g) | 0 | 2.03 | 1.73 | 2.02 |

TABLE 10-continued

|  | Control | Test 1 | Test 2 | Test 3 |
| --- | --- | --- | --- | --- |
| Milk Yield (%) | 0 | 36.63 | 33.71 | 36.06 |
| Degree of Protein Hydrolysis (%) | n/a | 8.3 | 3.6 | 31.3 |

For Example 6, the fibrous slurry was prepared as previously described. As shown in Table 10 a control lane had no enzyme added to the fibrous slurry. Test sample 1 contained uncooked slurry with added protease digested at high temperature. Test sample 2 contained uncooked slurry with added protease digested at low temperature. Test sample 3 contained cooked slurry prior to addition of protease and digested at high temperature. Degree of hydrolysis was determined as previously described. Yield increase was calculated based on the total solids in the secondary milk only.

In order to determine whether the degree of hydrolysis of protease treated fibrous slurry was related to the observed yield increase, the level of yield increase for protease treated slurry was measured at high temperature (57° C.), low temperature (10° C.) and high temperature (55° C.) where the fibrous slurry had been previously boiled. These conditions were then replicated for SDS-PAGE analysis.

With regard to Table 10, samples of oat fibrous slurry were digested with NEUTB endoprotease (BIO-CAT). The nutrient yield from the fibrous slurry was measured. The yield increase for protease digestion at low temperature (10° C.) was similar to that at high temperature (57° C.) and that at cooked high temperature (boiled followed by 57° C.), where the sample was first boiled. The results show a surprisingly high protease extraction at low temperatures and low degree of hydrolysis.

The number of washes is related to the yield for amylase treatment. Extraction from 2 washings will show a yield increase with amylase treatment control because the washing/grinding process alone will extract some nutrients. After 3 washes nothing else will be removed with washing alone. The product of two washes will go into the primary milk. A third wash will produce no results in terms of extraction. Therefore, for the process of the present disclosure, the fibrous slurry separated for protease extraction is what is left after the second wash. What is shown in the control lane for Table 9 is what is extracted with water from a third wash.

SDS-PAGE gel electrophoresis was performed to show the effect of protease treatment on the size of the proteins in the fibrous slurry, as shown in FIG. 4. Lane #812 contains a cooked sample, showing protein from a fibrous slurry that had been boiled in a microwave and treated with NEUTB endoprotease BIO-CAT. Lane #752 is a control sample, showing protein from the fibrous slurry that had not been treated with protease. Lane #243 shows protein from the fibrous slurry that had been treated with protease at higher (optimal) temperature, optimal for NEUTB endoprotease BIO-CAT being 57° C. for 2 hours. Lane #277 shows the protein treated with protease at low temperature, 10° C. for 1 hour.

The cooked sample control in lane #812 showed a high degree of protease hydrolysis. Control lane #752 showed the intact proteins of the fibrous slurry untreated by protease. Major bands are present at 35 kDA and 22 kDa, with minor bands present between these two. Lane #812, showing cooked and protease treated protein from the fibrous oat slurry, showed a high degree of hydrolysis (DH), with the large band at 35 kDA being fully hydrolyzed by the protease, and increased intensity of bands at 14 kDa and 12 kDa, likely representing the hydrolysis products of the 35 kDa band, and increased hydrolyzed products between 0 and 12 kDa.

The higher reaction temperature condition of 57° C. for 2 hours, shown in lane #243, showed significant hydrolysis of the 35 kDa band when compared to the control. Some increase in the bands at 14 kDa and 12 kDa, likely representing hydrolysis products of the 35 kDa band, was also observed. A decrease in intensity in the 35 kDa band is expected for protease hydrolysis at optimal temperatures. Higher temperature protease digestion resulted in some increase in the degradation products between 0 and 12 kDa.

The low temperature protease treatment is shown in lane #277. This sample showed a high level of nutrient yield increase, close to that of treatment at the optimal protease conditions. In contrast to the high temperature treated fibrous slurry (#243), however, the low temperature treated fibrous slurry (#277) did not have a negative impact on organoleptic properties of the #243 sample, was not subjected to conditions that could lead to microbial growth or protein denaturation, and did not show evidence of significant hydrolysis relative to control lane #752. In summary, the #277 sample surprisingly showed a very low DH, while increasing yield to a significant extent, with the low DH likely contributing to its positive organoleptic and taste qualities.

Example 7

Table 11 shows the quantity of total dietary fiber and beta-glucan in oat milks from NEUTB endoprotease BIO-CAT treated fibrous slurry at or below 10° C. Using combined samples disclosed in Table 6, the amount of beta glucan recovered from the fibrous slurry was determined.

TABLE 11

|  | Control No-Protease | Protease added |
|---|---|---|
| Combined Primary and Secondary Milk: |  |  |
| Total Dietary Fiber (%) | 2.67 | 5.06 |
| β-Glucan (%) | 1.6 | 3.35 |
| Fiber Waste: |  |  |
| Total Dietary Fiber (%) | 6.77 | 4.94 |
| β-Glucan (%) | 3.23 | 1.24 |
| Total (Fiber Waste + Milk): |  |  |
| Total Dietary Fiber (%) | 9.43 | 10.00 |
| β-Glucan (%) | 4.83 | 4.59 |

In Example 7, multiple test samples of fibrous slurry treated with Neutral Protease L (NEUTB endoprotease BIO-CAT) at 10° C. or below for different incubation times were combined to provide enough material for a beta glucan content analysis. The beta glucan content analysis was performed by Medallion Labs® (Minneapolis, MN, U.S.A.). The control sample was subject to mechanical processes only, without addition of enzyme. Test samples contained fibrous slurry treated with Neutral Protease L (NEUTB endoprotease BIO-CAT) at 10° C. or below for different incubation times. Percent calculations were on a dry substance basis. It is thought that initially, the primary milk has approximately 1% beta glucan. 0.6% may be added by multiple washing of the fibrous slurry. Protease treatment of the fibrous slurry, however, can increase beta glucan by more than double, as is shown in Table 11 in the combined primary and secondary milk data.

Example 8

Example 8 relates to the proximate composition and yield of secondary oat milk from Neutral Protease L (NEUTB endoprotease BIO-CAT) treated fibrous slurry at 2° C.

TABLE 12

|  | Control | NEUTB |
|---|---|---|
| Grain weight (g) | 86.7 | 86.7 |
| Total water used in milking (g) | 700 | 700 |
| # of washings to obtain slurry | 1 | 1 |
| Qty of α-Amylase (mg) | 10 | 10 |
| Qty of Neutral Protease (mg) | 0 | 50 |
| Incubation temperature (° C.) | n/a | 2 |
| Incubation time (minutes) | n/a | 120 |
| Qty of solid in $2^{nd}$ milk (g) | 16.02 | 22.25 |
| Total Milk yield (%) | 77 | 94 |
| $2^{nd}$ Milk: |  |  |
| Ash (%) | 1.19 | 1.51 |
| Carbohydrate (%) | 83.33 | 75.85 |
| Fat (%) | 8.60 | 7.85 |
| Protein (%) | 6.88 | 14.79 |
| Total Solid in $2^{nd}$ Milk (%) | 5.82 | 7.65 |

The fibrous slurry was prepared as previously described. The control sample did not include addition of enzyme. The NEUTB endoprotease BIO-CAT sample contained fibrous slurry treated with NEUTB endoprotease BIO-CAT at 2° C. for 120 minutes. Enzyme was inactivated for the test retentate after heating the raw milk in a water bath to 77° C. for 7 minutes span followed by heating to a boil in a microwave. Measurements were made on a dry substance basis. Total milk yield was measured as a combination of the primary and secondary milks. It is predicted that the secondary milk will be potentially up to 35% starch or lower in starch content than primary oat milk, which may be advantageous for a low or reduced carbohydrate plant based milk.

In a separate, preliminary experiment designed to measure yield increases for individual nutrients, with NEUTB endoprotease BIO-CAT treatment for 2 hours at 10° C., the breakdown of the increase in total yield was approximately 10% of protein, 15% of fat, 9% of ash, with fiber measurements requiring further testing. The secondary milk had good taste, described as more oat-like than the primary milk, and good texture. It is likely that the high amount of beta glucan present in the fibrous slurry was extracted into the secondary milk and contributed to the full body of the secondary milk. The secondary milk produced by the process of the present disclosure did not have the bitter taste associated high degrees of protein hydrolysis. Adding the secondary milk to the primary milk did not detract from the overall taste or texture of the primary milk.

Example 9

Example 9 discloses yield, milk qualities and degree of protein hydrolysis (DH) from fibrous slurry treated with different proteases.

TABLE 13

|  | CONT | AAMY | NEUTB | TRY1 | PAPN | ALKP |
|---|---|---|---|---|---|---|
| $CaCl_2$ (%) | 0.03 | 0.03 | 0.03 | 0.03 | 0.03 | 0.03 |
| $CaCO_3$ (%) | 0.05 | 0.05 | 0.05 | 0.05 | 0.05 | 0.05 |
| α-Amylase (%) | 0.05 | 0.05 | 0.05 | 0.05 | 0.05 | 0.05 |
| $2^{nd}$ Enzyme (%) | 0 | 0.033 | 0.033 | 0.033 | 0.033 | 0.033 |
| Incubation Temp (° C.) | n/a | 2.8-5.4 | 2.8-5.4 | 2.8-5.4 | 2.8-5.4 | 2.8-5.4 |
| Incubation Time (min) | 0 | 30 | 30 | 30 | 30 | 30 |
| pH of Milk | 6.65 ± 0.03 | 6.64 ± 0.04 | 6.64 ± 0.10 | 6.68 ± 0.05 | 6.61 ± 0.04 | 7.09 ± 0.33 |
| Yield (%) | 84.02 ± 0.11 | 85.74 ± 0.88 | 88.77 ± 0.86 | 87.21 ± 0.42 | 85.82 ± 1.51 | 86.38 ± 0.40 |
| Foam Quality | 4.8 ± 0.3 | 4.3 ± 0.8 | 4.6 ± 0.6 | 4.6 ± 0.4 | 3.9 ± 0.5 | 4.8 ± 0.2 |
| Foam Volume (mL) | 220 ± 13 | 214 ± 25 | 219 ± 27 | 218 ± 18 | 195 ± 20 | 219 ± 18 |
| Viscosity (cPs) | 44 ± 14 | 37 ± 5 | 37 ± 8 | 41 ± 12 | 52 ± 1 | 57 ± 7 |
| Organoleptic Quality | 5.3 ± 0.4 | 5.1 ± 0.7 | 6.3 ± 0.3 | 6.0 ± 0.7 | 6.1 ± 0.9 | 5.4 ± 0.8 |
| Degree of Hydrolysis (%) | 0.0 ± 0.0 | 0.5 ± 0.5 | 2.0 ± 1.0 | 2.0 ± 0.0 | 8.5 ± 1.5 | 6.5 ± 1.5 |

The fibrous slurry was prepared as previously described. Weight % was based on initial raw material weight. Yield was determined from combined primary and secondary oat milk. Yield was measured on a dry substance basis. Enzyme inactivation for the primary milk was performed by heating in a water bath to 77° C. for 15-20 minutes followed by heating to a boil in a microwave. Enzyme inactivation in the fibrous slurry to produce secondary milk was performed using the steam method as previously described. Foam quality, organoleptic quality and DH were determined as previously described.

The data from Table 13 is taken from the data of FIGS. 5A and 5B, which show SDS-PAGE of samples of protease digested oat fibrous slurry in accordance with the present disclosure. The yield increase relative to the control was highest for fibrous slurry treated with NEUTB endoprotease BIO-CAT at low temperature in accordance with the present disclosure, followed by fibrous slurry treated with microbial trypsin. The proteases papain and alkaline protease showed substantially lower yield increases. Amylase showed the lowest yield increase. Other experimental data showed that the effects of NEUTB endoprotease BIO-CAT on viscosity and yield increase are similar to Neutrase® endoprotease NOVOZYMES (data not shown).

Of the proteases tested, the DH was lowest for NEUTB endoprotease BIO-CAT and microbial trypsin, where the DH, calculated as previously described, was approximately 2%. The DH for papain was approximately 4 times greater than NEUTB endoprotease BIO-CAT and microbial trypsin, and the DH for alkaline protease was approximately 3 times greater than NEUTB endoprotease BIO-CAT and trypsin.

The results show that the DH does not correlate to yield increase, and that NPL and microbial trypsin cause greater increases in yield with far lower levels of hydrolysis. This result was unexpected, as it is generally thought that hydrolyzing proteins, or other organic molecules, leads to greater decreases in viscosity. Lower molecular weight generally correlates with lower viscosity solutions. Maximizing yield increase from the fibrous slurry while minimizing proteolysis is critical to the present disclosure, as it maintains protein functional properties and minimizes changes in organoleptic properties. The neutral proteases and microbial trypsin disclosed herein, out of all proteases tested, were the only two that met the requirements of the present disclosure in these respects.

Example 10

Example 10 discloses the effects of a wide variety of proteases on the viscosity of an oat fibrous slurry. Viscosity reduction is a main factor in allowing the processing of the fibrous slurry. Table 14 shows relative viscosity changes of oat fibrous slurry treated with various enzymes at 2° C.

TABLE 14

| | | Relative Viscosity to Initial Viscosity | | | | | |
|---|---|---|---|---|---|---|---|
| Enzymes | n | 1 min | 2 min | 3 min | 4 min | 5 min | 10 min |
| NEUTBS | 1 | 0.71 | 0.66 | 0.62 | 0.60 | 0.59 | 0.60 |
| NEUTB | 6 | 0.81 | 0.71 | 0.66 | 0.63 | 0.62 | 0.60 |
| NEUTN | 3 | 0.85 | 0.78 | 0.72 | 0.66 | 0.63 | 0.61 |
| TRY1 | 6 | 0.87 | 0.82 | 0.77 | 0.72 | 0.70 | 0.67 |
| FGPTA2 | 3 | 0.89 | 0.86 | 0.83 | 0.80 | 0.77 | 0.72 |
| FGPTHU | 3 | 0.89 | 0.86 | 0.82 | 0.80 | 0.80 | 0.76 |
| ALKP | 2 | 0.89 | 0.85 | 0.83 | 0.82 | 0.81 | 0.77 |
| FGPTA | 3 | 0.89 | 0.87 | 0.85 | 0.84 | 0.83 | 0.81 |
| TRY1ATKL | 1 | 0.88 | 0.86 | 0.85 | 0.84 | 0.83 | 0.84 |
| OZPST | 2 | 0.90 | 0.88 | 0.87 | 0.85 | 0.84 | 0.79 |
| PTAMHUT | 3 | 0.90 | 0.88 | 0.87 | 0.86 | 0.86 | 0.84 |
| AAMY | 3 | 0.93 | 0.91 | 0.88 | 0.87 | 0.86 | 0.86 |
| NEUTATKL | 1 | 0.90 | 0.89 | 0.88 | 0.87 | 0.87 | 0.86 |
| PRK4 | 1 | 0.90 | 0.88 | 0.88 | 0.88 | 0.87 | 0.94 |
| FLZM | 2 | 0.91 | 0.90 | 0.89 | 0.88 | 0.88 | 0.89 |
| CHTR | 1 | 0.86 | 0.84 | 0.85 | 0.88 | 0.88 | 0.95 |
| CBPT | 1 | 0.88 | 0.85 | 0.85 | 0.85 | 0.89 | 0.94 |
| PAPN | 2 | 0.92 | 0.90 | 0.90 | 0.89 | 0.90 | 0.93 |
| THERL | 1 | 0.89 | 0.87 | 0.88 | 0.89 | 0.91 | 1.00 |
| TRY4 | 1 | 0.92 | 0.92 | 0.91 | 0.92 | 0.91 | 0.96 |
| TRY5 | 1 | 0.90 | 0.89 | 0.89 | 0.90 | 0.92 | 0.96 |
| NONE | 5 | 0.93 | 0.93 | 0.93 | 0.94 | 0.95 | 0.99 |
| BRML | 2 | 0.96 | 0.96 | 0.96 | 0.96 | 0.97 | 0.99 |

Fibrous slurries were prepared as previously disclosed. Texture analysis was used to measure changes in viscosity in the fibrous slurry after enzyme treatment. Texture analysis was performed as previously described. Texture analysis can be used to measure changes in viscosity where the texture analyzer measures changes in compression force in a reaction over time. Reduced compression force over time, as measured by the texture analyzer, correlates to reductions in viscosity over time.

Initial viscosity is set to 1.0 after preparation of the fibrous slurry for texture analysis, as previously disclosed. After addition of the enzyme the texture analyzer continuously measures compression force applied to the sample as enzyme activity occurs. The final measurement in Table 14 shows the amount of viscosity reduction at a certain time point, which here is 10 minutes.

Table 14 shows that the neutral proteases tested herein, NEUTB endoprotease BIO-CAT and Neutrase® endoprotease NOVOZYMES, are the most effective in reducing viscosity of the oat fibrous slurry at 2° C. Microbial trypsin is, to a lesser extent, also effective in substantially reducing viscosity of the fibrous slurry. Fungal proteases FGPTA2 and FGPTHU reduce viscosity to a lesser extent. Fungal proteases are complex mixtures of enzymes and may include neutral proteases of the present disclosure and trypsin, along with other enzymes.

Generally, all other proteases or enzymes tested had low levels of viscosity reduction compared to NPL, Neutrase® endoprotease NOVOZYMES and microbial trypsin. The lower levels of viscosity reduction caused by enzymes other than the neutral proteases and microbial trypsin from Table 14 were unsatisfactory for the purposes of the present disclosure. Considering that viscosity reduction generally correlates with yield increase from the fibrous slurry, the neutral proteases and microbial trypsin were determined to be effective for the purposes of the present disclosure, while other proteases were not substantially effective.

Example 11

Example 11 discloses the relative viscosity changes of oat fibrous slurry treated with Neutral Protease L (NEUTB endoprotease BIO-CAT) at different enzyme concentrations at 2° C.

TABLE 15

| Concentration | | Relative Viscosity to Initial Viscosity | | | | | |
|---|---|---|---|---|---|---|---|
| (%) | n | 1 min | 2 min | 3 min | 4 min | 5 min | 10 min |
| 0.0005 | 1 | 0.93 | 0.88 | 0.84 | 0.82 | 0.78 | 0.71 |
| 0.0025 | 1 | 0.93 | 0.85 | 0.79 | 0.76 | 0.76 | 0.66 |
| 0.005 | 1 | 0.91 | 0.86 | 0.82 | 0.79 | 0.76 | 0.73 |
| 0.01 | 1 | 0.87 | 0.75 | 0.71 | 0.67 | 0.66 | 0.67 |
| 0.05 | 1 | 0.77 | 0.71 | 0.68 | 0.67 | 0.66 | 0.66 |

Fibrous slurries were prepared as previously disclosed. Enzyme concentration was based on the initial raw material weight. Texture analysis to measure viscosity reduction was performed as previously described.

Substantial viscosity reduction was evident even at very low concentrations of NPL. This indicates that very low levels of NPL or Neutrase® endoprotease NOVOZYMES are sufficient to achieve a yield increase from fibrous slurries in accordance with the present disclosure.

Example 12

Example 12 discloses the relative viscosity changes of oat fibrous slurry treated with Microbial Trypsin (TRY1) at different enzyme concentrations at 2° C.

TABLE 16

| Concentration | | Relative Viscosity to Initial Viscosity | | | | | |
|---|---|---|---|---|---|---|---|
| (%) | n | 1 min | 2 min | 3 min | 4 min | 5 min | 10 min |
| 0.0005 | 1 | 0.96 | 0.94 | 0.92 | 0.93 | 0.92 | 0.91 |
| 0.0025 | 1 | 0.95 | 0.91 | 0.87 | 0.85 | 0.83 | 0.79 |
| 0.005 | 1 | 0.93 | 0.89 | 0.85 | 0.84 | 0.81 | 0.79 |
| 0.01 | 1 | 0.91 | 0.87 | 0.83 | 0.81 | 0.79 | 0.74 |
| 0.05 | 1 | 0.90 | 0.83 | 0.74 | 0.73 | 0.73 | 0.71 |

Fibrous slurries were prepared as previously disclosed. Enzyme concentration was based on the initial raw material weight. Texture analysis to measure viscosity reduction was performed as previously described.

Substantial viscosity reduction was evident even at very low concentrations of microbial trypsin, however, when compared to NPL, microbial trypsin reduction in viscosity appears to be more concentration dependent. Generally, these results indicate that low levels of microbial trypsin are sufficient to achieve a yield increase from fibrous slurries in accordance with the present disclosure.

Example 13

Example 13 shows the relative viscosity changes of oat fibrous slurry with no enzyme addition at various pH at 2° C.

TABLE 17

| | | Relative Viscosity to Initial Viscosity | | | | | |
|---|---|---|---|---|---|---|---|
| pH | n | 1 min | 2 min | 3 min | 4 min | 5 min | 10 min |
| 10.94 | 1 | 0.86 | 0.87 | 0.88 | 0.88 | 0.88 | 0.90 |
| 4.38 | 1 | 0.92 | 0.92 | 0.94 | 0.95 | 0.96 | 0.96 |
| 6.89 | 1 | 0.89 | 0.89 | 0.89 | 0.90 | 0.93 | 1.00 |

Fibrous slurries were prepared as previously disclosed. No enzyme was added. pH was adjusted using citric acid anhydrous and 50% KOH solution. Texture analysis to measure viscosity reduction was performed as previously described.

The pH of the solution was adjusted prior to texture analysis. Neutral, or unadjusted, pH was also tested. After a minor initial drop in pH likely due to mechanical disruption, all samples gradually increased toward 1.0. At acidic pH, after 10 minutes, viscosity of the fibrous slurry was substantially unchanged. At basic pH, after 10 minutes, viscosity of the fibrous slurry was reduced by approximately 10%. Based on these results, pH does not greatly affect viscosity at the levels tested.

Example 14

Example 14 shows the effects of pH on the ability of NEUTB endoprotease BIO-CAT to decrease viscosity in oat fibrous slurries. Relative viscosity changes of oat fibrous slurry treated with Neutral Protease L (NEUTB endoprotease BIO-CAT) were measured at various pH at 2° C.

TABLE 18

| | | Relative Viscosity to Initial Viscosity | | | | | |
|---|---|---|---|---|---|---|---|
| pH | n | 1 min | 2 min | 3 min | 4 min | 5 min | 10 min |
| 9.36 | 1 | 0.72 | 0.55 | 0.46 | 0.40 | 0.40 | 0.37 |
| 6.88 | 1 | 0.70 | 0.61 | 0.53 | 0.52 | 0.51 | 0.49 |

TABLE 18-continued

| | | Relative Viscosity to Initial Viscosity | | | | | |
|---|---|---|---|---|---|---|---|
| pH | n | 1 min | 2 min | 3 min | 4 min | 5 min | 10 min |
| 4.36 | 1 | 0.83 | 0.76 | 0.72 | 0.68 | 0.63 | 0.54 |
| 10.91 | 1 | 0.80 | 0.73 | 0.69 | 0.65 | 0.63 | 0.60 |
| 10.84 | 1 | 0.81 | 0.73 | 0.70 | 0.68 | 0.66 | 0.61 |
| 4.35 | 1 | 0.87 | 0.81 | 0.77 | 0.75 | 0.70 | 0.63 |
| 11.25 | 1 | 0.82 | 0.80 | 0.77 | 0.73 | 0.72 | 0.68 |
| 11.38 | 1 | 0.83 | 0.79 | 0.77 | 0.74 | 0.73 | 0.69 |
| 4.04 | 1 | 0.87 | 0.83 | 0.82 | 0.81 | 0.79 | 0.74 |
| 3.76 | 1 | 0.88 | 0.85 | 0.83 | 0.80 | 0.80 | 0.81 |
| 3.24 | 1 | 0.90 | 0.89 | 0.88 | 0.86 | 0.86 | 0.87 |
| 2.92 | 1 | 0.91 | 0.89 | 0.88 | 0.87 | 0.86 | 0.87 |
| 12.13 | 1 | 0.91 | 0.90 | 0.90 | 0.90 | 0.91 | 0.94 |

Fibrous slurries were prepared as previously disclosed. pH was adjusted using citric acid anhydrous and 50% KOH solution. Texture analysis to measure viscosity reduction was performed as previously described. Table 18 shows the pH of the fibrous slurry after the acid or base was added and prior to 0.05% enzyme addition.

Example 15

Example 15 shows the effects of pH on the ability of Microbial Trypsin (TRY1) to decrease viscosity in oat fibrous slurries. Relative viscosity changes of oat fibrous slurry treated with Microbial Trypsin (TRY1) were measured at various pH at 2° C.

TABLE 19

| | | Relative Viscosity to Initial Viscosity | | | | | |
|---|---|---|---|---|---|---|---|
| pH* | n | 1 min | 2 min | 3 min | 4 min | 5 min | 10 min |
| 6.89 | 1 | 0.77 | 0.69 | 0.61 | 0.56 | 0.54 | 0.52 |
| 8.93 | 1 | 0.80 | 0.70 | 0.65 | 0.63 | 0.62 | 0.60 |
| 3.97 | 1 | 0.86 | 0.80 | 0.76 | 0.74 | 0.71 | 0.67 |
| 4.38 | 1 | 0.85 | 0.82 | 0.80 | 0.80 | 0.78 | 0.71 |
| 4.42 | 1 | 0.88 | 0.85 | 0.81 | 0.79 | 0.76 | 0.72 |
| 3.45 | 1 | 0.88 | 0.85 | 0.81 | 0.81 | 0.79 | 0.76 |
| 10.43 | 1 | 0.88 | 0.84 | 0.85 | 0.83 | 0.82 | 0.78 |
| 3.25 | 1 | 0.91 | 0.90 | 0.89 | 0.87 | 0.86 | 0.83 |
| 11.35 | 1 | 0.86 | 0.85 | 0.80 | 0.82 | 0.83 | 0.83 |
| 2.89 | 1 | 0.88 | 0.85 | 0.86 | 0.86 | 0.86 | 0.85 |
| 11.68 | 1 | 0.87 | 0.87 | 0.87 | 0.88 | 0.87 | 0.94 |
| 11.03 | 1 | 0.88 | 0.90 | 0.89 | 0.90 | 0.92 | 0.98 |
| 11.94 | 1 | 0.88 | 0.92 | 0.93 | 0.94 | 0.96 | 1.01 |

Fibrous slurries were prepared as previously disclosed. pH was adjusted using citric acid anhydrous and 50% KOH solution. Texture analysis to measure viscosity reduction was performed as previously described. Table 18 shows the pH of the fibrous slurry after the acid or base was added and prior to enzyme addition.

Example 16

Example 16 shows the relative viscosity changes of fibrous slurry with various substrates when treated with Neutral Protease L (NEUTB endoprotease BIO-CAT) or Microbial Trypsin (TRY1) at 2° C. in accordance with the present disclosure.

TABLE 20

| Substrates | | Relative Viscosity to Initial Viscosity | | | | | |
|---|---|---|---|---|---|---|---|
| (Enzymes) | n | 1 min | 2 min | 3 min | 4 min | 5 min | 10 min |
| Barley | | | | | | | |
| (None) | 1 | 0.93 | 0.92 | 0.91 | 0.91 | 0.91 | 0.90 |
| (NEUTB) | 1 | 0.83 | 0.76 | 0.72 | 0.69 | 0.67 | 0.67 |
| (TRY1) | 1 | 0.91 | 0.86 | 0.83 | 0.79 | 0.77 | 0.74 |
| Black Chia | | | | | | | |
| (None) | 1 | 0.95 | 0.95 | 0.97 | 0.99 | 1.00 | 1.01 |
| (NEUTB) | 1 | 0.95 | 0.95 | 0.95 | 0.97 | 0.97 | 0.98 |
| (TRY1) | 1 | 0.93 | 0.90 | 0.89 | 0.89 | 0.88 | 0.91 |
| Soy | | | | | | | |
| (None) | 1 | 0.98 | 0.96 | 0.95 | 0.95 | 0.95 | 0.96 |
| (NEUTB) | 1 | 0.85 | 0.83 | 0.81 | 0.81 | 0.82 | 0.80 |
| (TRY1) | 1 | 0.84 | 0.82 | 0.81 | 0.81 | 0.82 | 0.81 |
| Almond | | | | | | | |
| (None) | 1 | 0.96 | 0.96 | 0.96 | 0.95 | 0.95 | 0.94 |
| (NEUTB) | 1 | 0.96 | 0.95 | 0.94 | 0.94 | 0.92 | 0.91 |
| (TRY1) | 1 | 0.93 | 0.94 | 0.93 | 0.92 | 0.92 | 0.89 |
| Chickpea | | | | | | | |
| (None) | 1 | 0.88 | 0.86 | 0.84 | 0.84 | 0.83 | 0.83 |
| (NEUTB) | 1 | 0.82 | 0.82 | 0.81 | 0.81 | 0.81 | 0.82 |
| (TRY1) | 1 | 0.78 | 0.75 | 0.73 | 0.73 | 0.72 | 0.70 |
| Chicken Skin | | | | | | | |
| (None) | 3 | 0.97 | 0.98 | 0.98 | 0.97 | 0.96 | 0.98 |
| (NEUTB) | 8 | 0.96 | 0.96 | 0.97 | 1.02 | 0.98 | 1.02 |
| (TRY1) | 3 | 0.93 | 0.93 | 0.95 | 0.98 | 0.98 | 1.05 |

Fibrous slurries were prepared as previously disclosed. pH was adjusted using citric acid anhydrous and 50% KOH solution. Texture analysis to measure viscosity reduction was performed as previously described.

Chicken skin tests were performed at 2° C., 49° C. and 60° C. With regard to the chicken skin viscosity analysis, the chicken skin was tested as described below. In the case of chicken skin texture analysis, skin was obtained from fresh chicken thigh quarter cut by pulling skin off from muscles. The skin was washed with approximately 2× ice water (weight basis), and sliced and cut into approximately 5×5 mm pieces with a sharp knife and a cutting board in a walk in cooler (1.7° C.).

To the chopped skin, 2× or 3× amount of ice+cold distilled water of the skin quantity to make the final solid content approximately 10%. Then, the mix was blended at high (10/10 setting) speed for 2 minutes using the Vita-Mix TurboBlend 4500. High concentration slurry had approximately 15% solid in the case of chicken 2× ice water was added to chopped skin, and blended. In the case of low solid concentration 3× ice water was added, and the slurry for texture analyses had approximately 10% solid, respectively.

Chicken skin tests were performed in part because the BIO-CAT product information sheet for NEUTB endoprotease BIO-CAT suggests the use of Neutrase® endoprotease NOVOZYMES for, among other uses, viscosity reduction for fish and chicken byproducts. The product information sheet also provides information on the optimal activity conditions for use of NEUTB endoprotease BIO-CAT, which are listed as 55° C. and a pH of 6.5. The optimal temperature listed by BIO-CAT is far higher than the temperature used in the present disclosure, and therefore, the low, suboptimal temperatures used in the present disclosure were tested with chicken skin, with one of the substrates suggested by the BIO-CAT product information sheet. As shown in Table 20, at a temperature within the scope of the present disclosure (2° C.) no reduction in viscosity by NEUTB endoprotease BIO-CAT (NEUTB) was observed.

For the chicken skin viscosity measurement, the chicken skin slurry was stored in a walk in refrigerator for 30 minutes undisturbed, and the same parameters as measuring texture changes in grains and nuts were applied to measure the viscosity changes in the chicken skin. In addition to the 2° C. texture analysis, the chicken skin slurry was warmed to 49° C. and 60° C. prior to addition of enzymes and texture analysis. During the texture change analysis, the temperature of the chicken skin slurry was maintained at the same as the initial temperature by placing the texture analysis cup in cold ice water bath, warm water or hot water bath throughout the texture analyses.

With regard to the overall data shown in Table 20, the yield data in Tables 2-4 and the viscosity reduction in Table 20 showed there is a close relationship (correlation) between the milk yield increase and viscosity reduction in texture analyses. For the oat fibrous slurry, the viscosity reduction was high and thus the yield increase of oat milk from the process of the present disclosure was high; whereas, the viscosity reduction in almond and chickpea was not as high as for oat, and similarly, the milk yield increase was low. Therefore, the viscosity reduction in texture analyzer is useful in predicting plant based milk yield increase. Based on the data from Table 20, it appears that the viscosity decrease caused by protease treatment in accordance with the present disclosure is synergistic with the presence of beta glucan in the substrate material. While the present disclosure has primarily been described as a low temperature protease treatment process, the process may, in some embodiments, also have applications at higher temperatures for nutrient extraction from milled cereal grains containing beta glucan.

The beta glucan-containing substrates tested in the present disclosure, oat and barley, showed a much greater reduction in viscosity, even when the starting viscosity of non-beta glucan containing substrates such as soy was similar to that of oat and barley. As shown in table 20, for barley, the relative viscosity reduction of the control at 10 minutes (0.90) compared to the NEUTB endoprotease BIO-CAT (0.67) and trypsin treated (0.74).

Example 17

Example 17 shows changes in viscosity, as measured in centipoise (cPs) for uncooked oat fibrous slurry at 2° C. for 22 minutes.

TABLE 21

|  | Treatment | |
| --- | --- | --- |
|  | NEUTB | TRY1 |
| Total Solid (%) | 10.61 | 10.88 |
| pH |  |  |
| Pre | 6.72 | 6.66 |
| Post | 6.48 | 6.49 |
| Viscosity (cPs) |  |  |
| Pre | 513 | 445 |
| Post | 29 | 59 |

Fibrous slurries were prepared as previously disclosed. Viscosity was measured by viscometer as previously described. As used herein "Pre" refers to prior to addition of enzymes and "Post" refers to after completion of enzyme treatment.

pH was essentially unchanged before and after enzyme treatment. NPL and microbial trypsin showed similar decreases in viscosity, although NPL showed a greater viscosity reduction than microbial trypsin.

Example 18

Example 18 shows viscosity and other properties of secondary oat milk from the fibrous slurry when treated with NPL and trypsin in conjunction with alpha amylase at 2° C. for 2 hours with a slower (non-steam) deactivation of enzymes.

TABLE 22

|  | Enzyme Quantity (%) | |
| --- | --- | --- |
|  | NEUTB (0.05) | TRY1 (0.05) |
| Retentate Slurry Solid (%) | 7.97 | 7.97 |
| Qty of α-Amylase (%) | 0.05 | 0.05 |
| Total Solid (%) | 6.27 | 6.49 |
| $2^{nd}$ Milk (%) |  |  |
| Yield (%) | 88 | 87 |
| pH | 6.67 | 6.69 |
| Viscosity (cPs) | 29 | 24 |
| β-Glucan (%) | 10.16 | 9.37 |
| Organoleptic | 6.5 | 7.5 |
| Easy of Sifting | 1.5 | 2.0 |

Fibrous slurries were prepared as previously disclosed. Viscosity was measured by viscometer as previously described. Organoleptic properties were evaluated as previously described. To deactivate enzymes, as previously described, samples were heated in a hot water bath up to 77° C. for 7 minutes, and further heated to boil in a microwave for less than 2 minutes. Sample concentrations were based on the initial raw material weight. Sifting was evaluated using a 5 point scale: (1) Very easy to sift, (3) neither easy nor difficult to sift, and (5) very difficult to impossible to sift. In samples from examples 18, 20 and 21, milk from a combination of samples was combined and oven dried and β-Glucan was determined by Medallion labs.

Example 19

Example 19 relates to the properties of secondary oat milk from the fibrous slurry treated with different enzymes with alpha-amylase at 2° C. for 2 hours with a slow (non-steam) heat deactivation of enzymes.

TABLE 23

|  | Treatment (% Qty of Enzymes) | |
| --- | --- | --- |
|  | NEUTB (0.05) | TRY1 (0.05) |
| Fibrous Slurry Slurry Solid (%) | 10.97 | 10.97 |
| Qty of α-Amylase (%) | 0.01 | 0.01 |
| Total Solid (%) | 6.74 | 7.01 |
| $2^{nd}$ Milk (%) |  |  |
| Yield (%) | 81 | 79 |
| pH | 6.58 | 6.58 |
| Protein (%) | 13.85 | 14.09 |
| Organoleptic | 7 | 6.5 |
| Easy of Sifting | 1.7 | 2.5 |

Fibrous slurries were prepared as previously disclosed. Viscosity was measured by viscometer as previously described. Organoleptic properties were evaluated as previously described. To deactivate enzymes, as previously described, samples were heated in a hot water bath up to 77° C. for 7 minutes, and further heated to boil in a microwave for less than 2 minutes. Sample concentrations were based on the initial raw material weight. Sifting was evaluated using a 5 point scale: (1) Very easy to sift, (3) neither easy nor difficult to sift, and (5) very difficult to impossible to sift.

Example 20

Example 20 shows viscosity and other properties of secondary oat milk slurries with different enzymes without «-amylase at 2° C. for 2 hours with a slow (non-steam) heat deactivation of enzymes.

TABLE 24

|  | Enzyme Quantity (%) | |
| --- | --- | --- |
|  | NEUTB (0.05) | TRY1 (0.05) |
| Retentate Slurry Solid (%) | 8.51 | 8.51 |
| Qty of α-Amylase (%) | 0.00 | 0.00 |
| Total Solid (%) 2$^{nd}$ Milk (%) | 6.45 | 6.63 |
| Yield (%) | 80 | 72 |
| pH | 6.29 | 6.34 |
| Viscosity (cPs) | 47 | 386 |
| Organoleptic | 7 | 6.5 |
| Easy of Sifting | 2.0 | 4.5 |

Fibrous slurries were prepared as previously disclosed. Viscosity was measured by viscometer as previously described. Samples were heated to 80° C. in 0.5 minute by directly injecting steam into the slurry using Nuova Simonelli Appia II V GR1, and further heated to boil in a microwave for less than 1 minute, as previously described. Measurements were based on the initial raw material weight. Sifting was evaluated using a 5 point scale: (1) Very easy to sift, (3) neither easy nor difficult to sift, and (5) very difficult to impossible to sift, as previously described.

Example 21

Example 21 shows the effect of rapid (steam treated) enzyme deactivation on viscosity and other properties of secondary oat milk with fibrous slurry treated with NPL and microbial trypsin without alpha amylase at 2° C. for 2 hours.

TABLE 25

|  | Enzymes Quantity (%) | |
| --- | --- | --- |
|  | NEUTB (0.05) | TRY1 (0.05) |
| Retentate Slurry Solid (%) | 8.43 | 8.43 |
| Qty of α-Amylase (%) | 0.00 | 0.00 |
| Total Solid (%) 2$^{nd}$ Milk (%) | 5.50 | 5.51 |
| Yield (%) | 78 | 71 |
| pH | 6.68 | 6.66 |
| Viscosity (cPs) | 52 | 175 |
| Organoleptic | 8 | 5.5 |
| Ease of Sifting | 1.5 | 4.5 |

Fibrous slurries were prepared as previously disclosed. Viscosity was measured by viscometer as previously described. Samples were heated to 80° C. in 0.5 minute by directly injecting steam into the slurry using Nuova Simonelli Appia II V GR1, and further heated to boil in a microwave for less than 1 minute, as previously described. Measurements were based on the initial raw material weight. Sifting was evaluated using a 5 point scale: (1) Very easy to sift, (3) neither easy nor difficult to sift, and (5) very difficult to impossible to sift, as previously described.

Example 22

Example 22 shows the starting viscosity, pH and solids content of untreated, diluted fibrous slurries of different materials for texture analyses at 2° C. Steam injection provided a somewhat superior product when compared to slower heat deactivation of enzyme. Table 25 showed that steam deactivation (or rapid deactivation) in combination with NEUTB endoprotease BIO-CAT, in the absence of alpha amylase, resulted in a product having superior organoleptic properties and was easier to sift. Viscosity remained low with NEUTB endoprotease BIO-CAT but not for the microbial trypsin proteases otherwise effective in the present disclosure. While microbial trypsin was shown to be effective, although not as effective as the metalloproteases, in reducing viscosity and yield in accordance with the present disclosure, NEUTB endoprotease BIO-CAT and Neutrase® endoprotease NOVOZYMES were more effective in some respects as shown in table 25.

TABLE 26

|  |  | Parameters | | |
| --- | --- | --- | --- | --- |
| Materials | n | Solid (%) | pH | Viscosity (cPs) |
| Oat | 23 | 10.34 ± 0.58 | 6.67 ± 0.05 | 513 ± 84 |
| Barley | 3 | 14.42 ± 0.26 | 5.67 ± 0.06 | 527 ± 80 |
| Black chia | 3 | 13.02 ± 0.30 | 6.91 ± 0.12 | 106 ± 16 |
| Soy | 3 | 12.40 ± 0.31 | 6.68 ± 0.07 | 414 ± 79 |
| Chickpea | 3 | 11.87 ± 0.16 | 6.43 ± 0.05 | 181 ± 23 |
| Almond | 3 | 10.35 ± 0.10 | 6.50 ± 0.03 | 39 ± 4 |
| Chicken skin | 3 | 15.94 ± 0.53 | 7.25 ± 0.00 | 469 ± 116 |

Fibrous slurries were prepared as previously described. Measurements are shown as average±standard deviation.

Data from Table 26 shows starting concentrations of untreated fibrous slurries. This data can be used as a general reference for other data provided in the present disclosure.

Example 23

Example 23 shows the relative viscosity changes of 10% chickpea protein isolate slurry treated with different enzymes at 2° C. or 50° C.

TABLE 27

|  |  |  | Initial Viscosity | Relative Viscosity to Initial Viscosity | | | |
| --- | --- | --- | --- | --- | --- | --- | --- |
| Enzymes | n | Temp (° C.) | (0 min) (cPs) | 1 (min) | 5 (min) | 10 (min) | 20 (min) |
| NONE | 1 | 2 | 27 | 0.94 | 0.95 | 0.94 | 0.94 |
| NEUTB | 1 | 2 | 26 | 0.94 | 0.94 | 0.98 | 0.98 |
| NEUTB | 1 | 50 | 10 | 0.93 | 0.84 | 0.78 | 0.72 |
| TRY1 | 1 | 2 | 25 | 0.94 | 0.97 | 0.98 | 0.98 |

Protein slurries were prepared as previously described. Temperature is the incubation temperature during the texture analysis. Initial viscosity is prior to addition of enzymes and texture analysis.

The results show that at 2° C. and for a reaction time of 20 min., neutral proteases and microbial trypsin of the present disclosure that are effective in reducing viscosity of oat, barley and other plant material had no effect on reducing the viscosity of a 10% chickpea protein isolate slurry. At 50° C., NEUTB endoprotease BIO-CAT reduced the viscosity of the chickpea material by approximately 25%.

Example 24

Example 24 discloses the relative viscosity changes of 21% pea protein isolate slurry treated with different enzymes at 2° C. or 50° C.

TABLE 28

| Enzymes | n | Temp (° C.) | Viscosity (cPs) | Relative Viscosity to Initial Viscosity | | | |
|---|---|---|---|---|---|---|---|
| | | | | 1 (min) | 5 (min) | 10 (min) | 20 (min) |
| NONE | 1 | 2 | 567 | 0.96 | 0.94 | 0.94 | 0.91 |
| NEUTB | 1 | 2 | 567 | 0.94 | 0.92 | 0.93 | 0.96 |
| NEUTB | 1 | 50 | 207 | 0.94 | 0.92 | 0.93 | 0.92 |
| TRY1 | 1 | 2 | 567 | 0.94 | 0.93 | 0.98 | 0.97 |

Protein slurries were prepared as previously described. Temperature is the incubation temperature during the texture analysis. Initial viscosity is prior to addition of enzymes and texture analysis.

The results show that at 2° C., neutral proteases and microbial trypsin of the present disclosure that are effective in reducing viscosity of oat, barley and other plant material had no effect on reducing the viscosity of a pea protein isolate slurry. At 50° C., NEUTB endoprotease BIO-CAT reduced the viscosity of the chickpea material by approximately 8% after a 20 minute incubation.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method comprising:
   milling at least one of a grain, nut and seed and producing an aqueous slurry from the milled at least one of a grain, nut and seed;
   sifting the aqueous slurry to produce a primary milk and a fibrous slurry;
   treating the fibrous slurry with an endoprotease at a suboptimal protease activity temperature to produce a treated fibrous slurry;
   sifting the treated fibrous slurry to produce a secondary milk and a clean fiber; and,
   combining the secondary milk with the primary milk.

2. The method of claim 1, wherein the milling is accomplished by aqueous wet milling the at least one of a grain, nut and seed to produce the aqueous slurry.

3. The method of claim 1, wherein the endoprotease is a metalloendoprotease.

4. The method of claim 1, wherein the endoprotease is at least one of a fungal, neutral metalloendoprotease and a bacterial, neutral metalloendoprotease.

5. The method of claim 1, wherein the endoprotease is an M4 class neutral, metalloendoprotease.

6. The method of claim 1, wherein the endoprotease is a thermolysin.

7. The method of claim 1, wherein the endoprotease is a metalloendoprotease having a specificity primarily for leucine and phenylalanine.

8. The method of claim 1, wherein the endoprotease is a metalloendoprotease having a specificity for binding a divalent metal cation.

9. The method of claim 1, wherein the endoprotease is a metalloendoprotease having a specificity for binding a divalent metal cation selected from the group consisting of $Zn^{2+}$, $Mg^{2+}$, $Cu^{2+}$ and $Ca^{2+}$.

10. The method of claim 1, wherein the endoprotease is a bacillolysin.

11. The method of claim 1, wherein the endoprotease is a subtilisin.

12. The method of claim 1, wherein the endoprotease is selected from the group consisting of a metalloendoprotease derived from *Bacillus subtilis* and a metalloendoprotease derived from *Bacillus amyloliquefaciens*.

13. The method of claim 1, wherein the at least one of a grain, nut and seed is at least one of an oat grain and a barley grain.

14. The method of claim 1, wherein the at least one of a grain, nut and seed is a cereal grain containing beta glucan.

15. The method of claim 1, wherein the suboptimal protease activity temperature is below 10° C. and the treated fibrous slurry is treated with the endoprotease for less than 30 minutes.

16. The method of claim 1, wherein a concentration of beta glucan in the secondary milk is at least twice the concentration of beta glucan in the primary milk on a dry solids basis.

17. The method of claim 1, wherein a combined milk comprised of a combination of the primary milk and the secondary milk contains at least half of all beta glucan contained in the at least one of a grain, nut and seed on a dry solids basis.

18. The method of claim 1, wherein a viscosity of the fibrous slurry decreases by at least 30% within a time period of 10 minutes after addition of the endoprotease to the fibrous slurry.

19. A method comprising:
   milling a plant raw material and producing an aqueous slurry from the milled plant raw material;
   sifting the aqueous slurry to produce a primary milk and a fibrous slurry;
   treating the fibrous slurry with an endoprotease at a suboptimal protease activity temperature to produce a treated fibrous slurry;
   sifting the treated fibrous slurry to produce a secondary milk and a clean fiber; and
   combining the secondary milk with the primary milk.

20. The method of claim 19, wherein the endoprotease is a bacillolysin.

21. The method of claim 19, wherein the endoprotease is a metalloendoprotease.

* * * * *